Oct. 1, 1946.　　P. T. TUCKER ET AL　　2,408,707
GUN MOUNTING AND CONTROL MECHANISM
Filed Aug. 16, 1941　　21 Sheets-Sheet 1

FIG.I.

INVENTORS
PRESTON T. TUCKER
WILLIS G. STEWART
JAMES H. TANNER
BY
ATTORNEYS

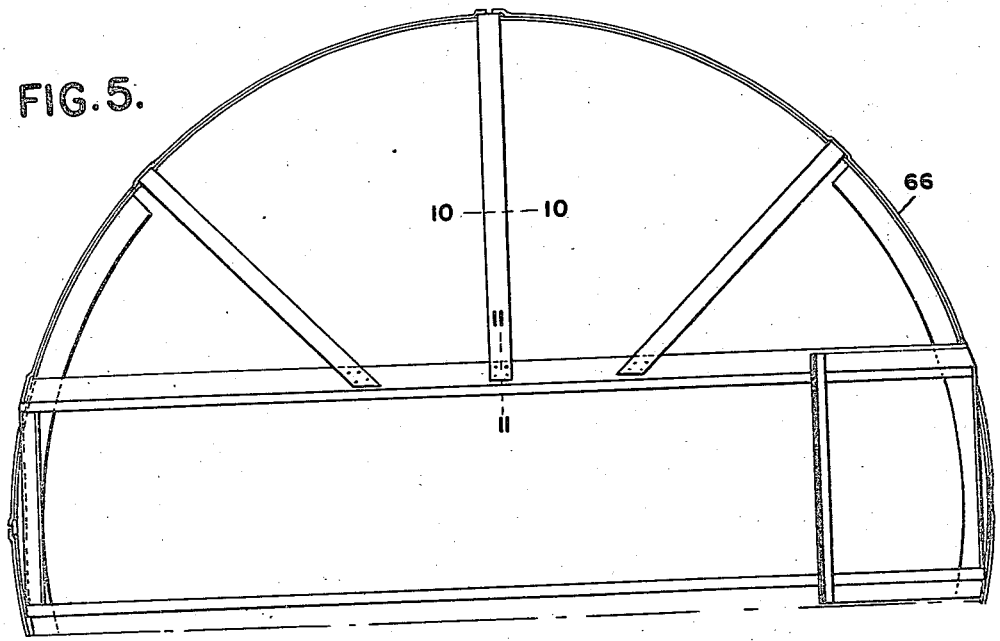
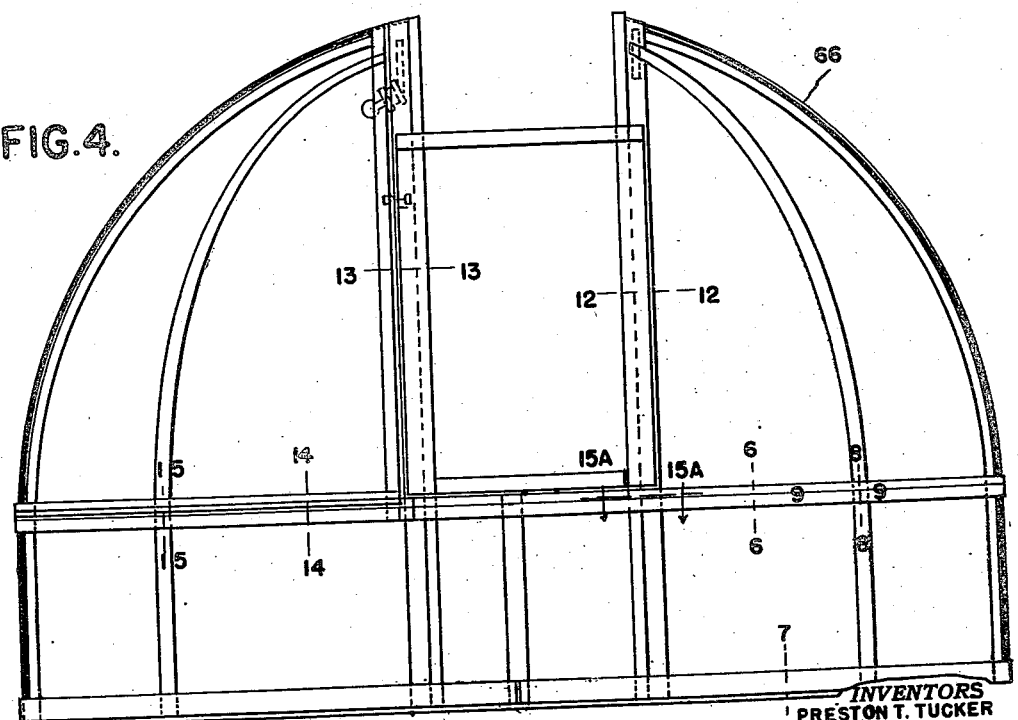

Oct. 1, 1946. P. T. TUCKER ET AL 2,408,707
GUN MOUNTING AND CONTROL MECHANISM
Filed Aug. 16, 1941 21 Sheets-Sheet 5
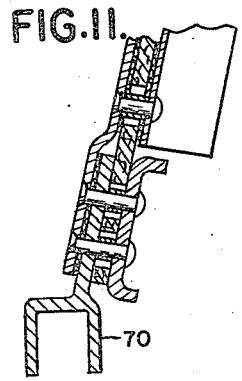
FIG.11.
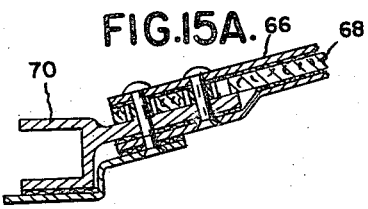
FIG.15A.
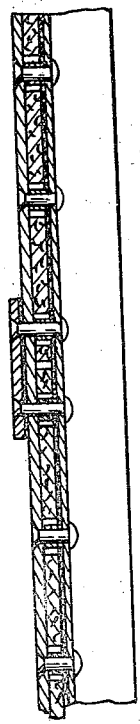
FIG.8.
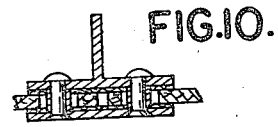
FIG.10.
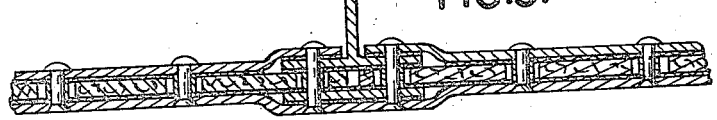
FIG.9.
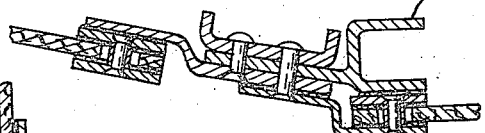
FIG.13.
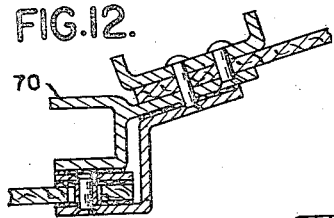
FIG.12.
FIG.15.
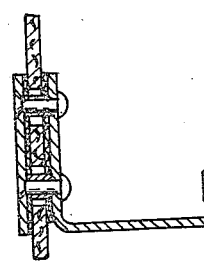
FIG.14. FIG.6.
FIG.7.
INVENTORS
PRESTON T. TUCKER
WILLIS G. STEWART
JAMES H. TANNER
BY
ATTORNEYS

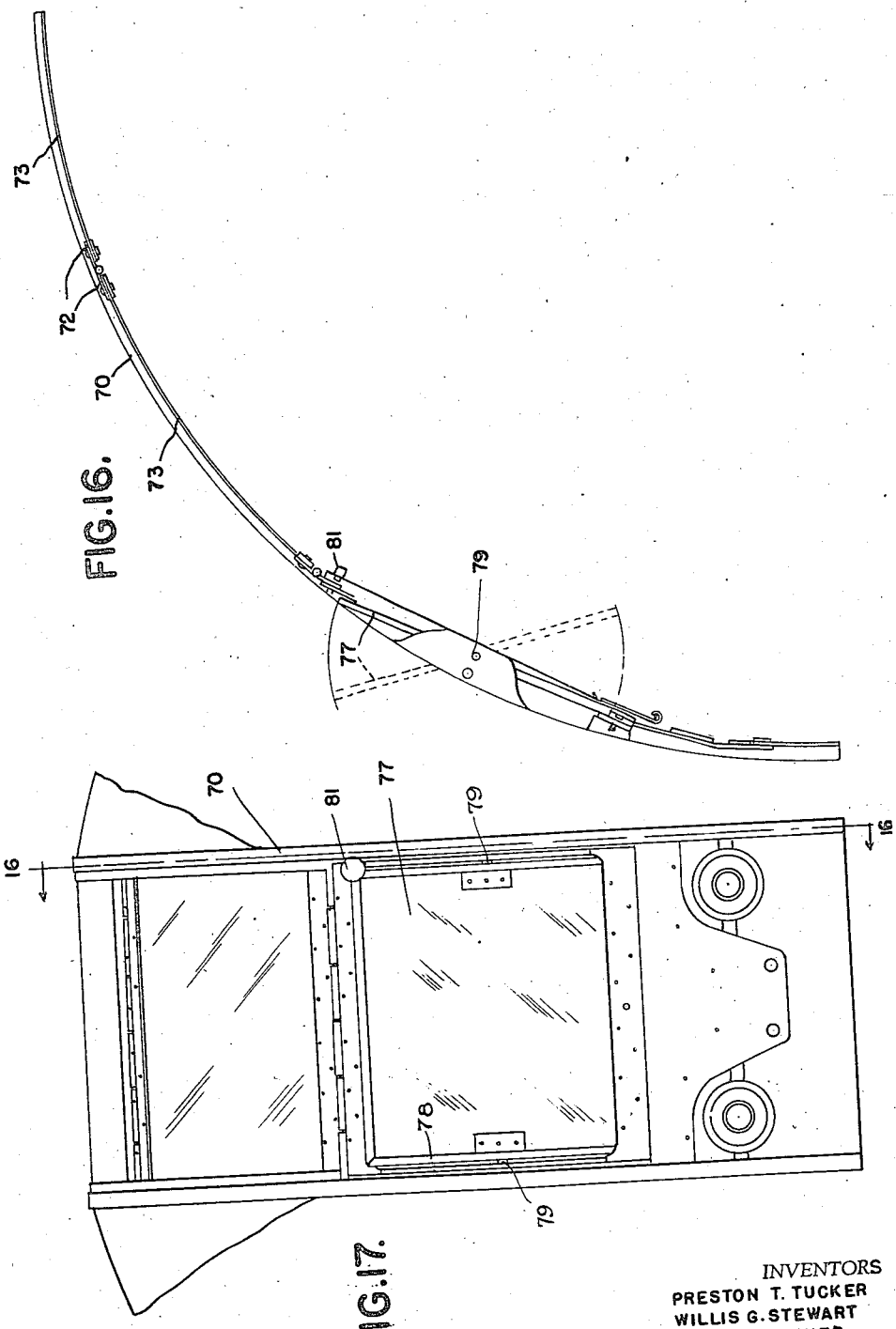

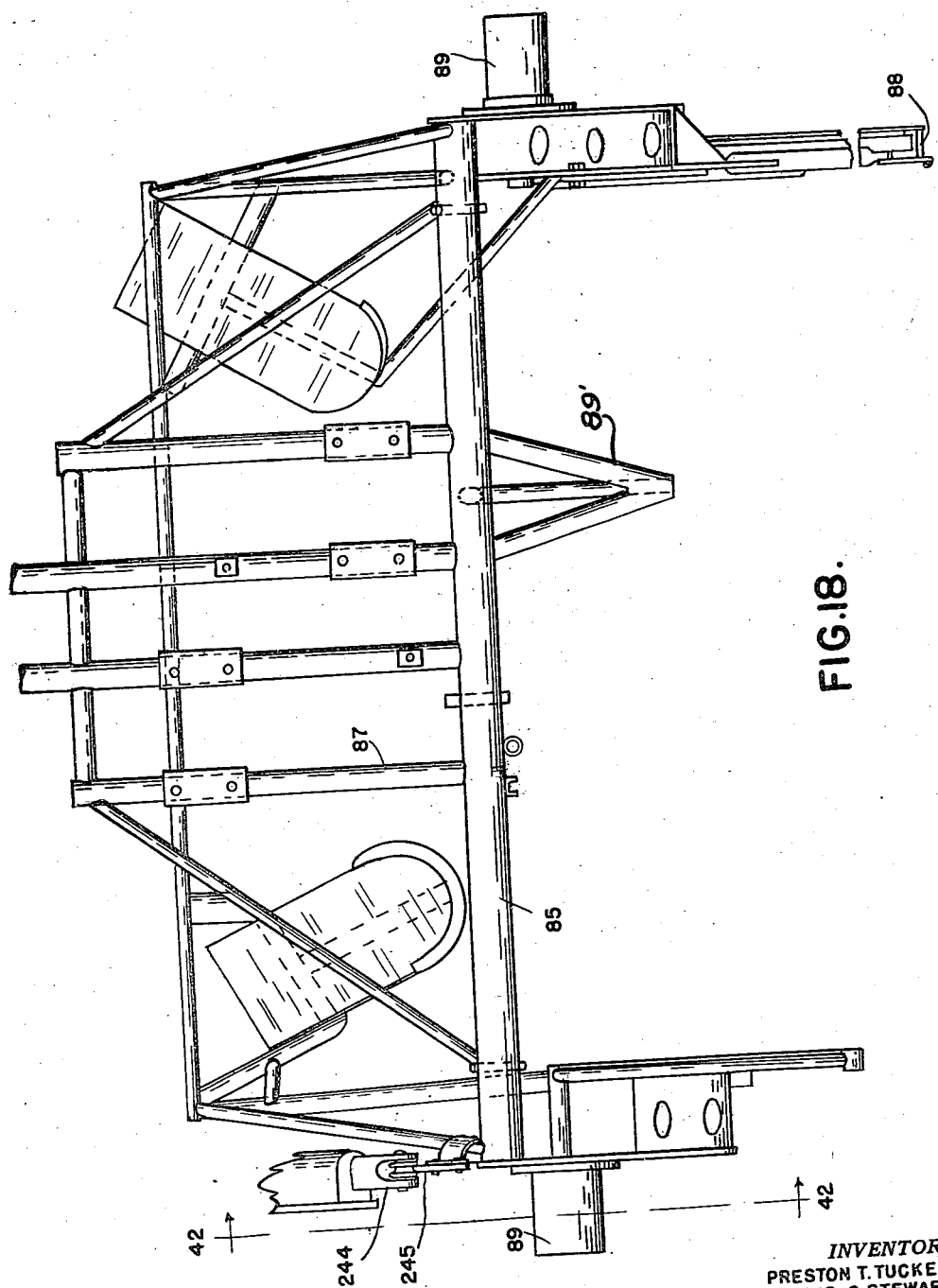

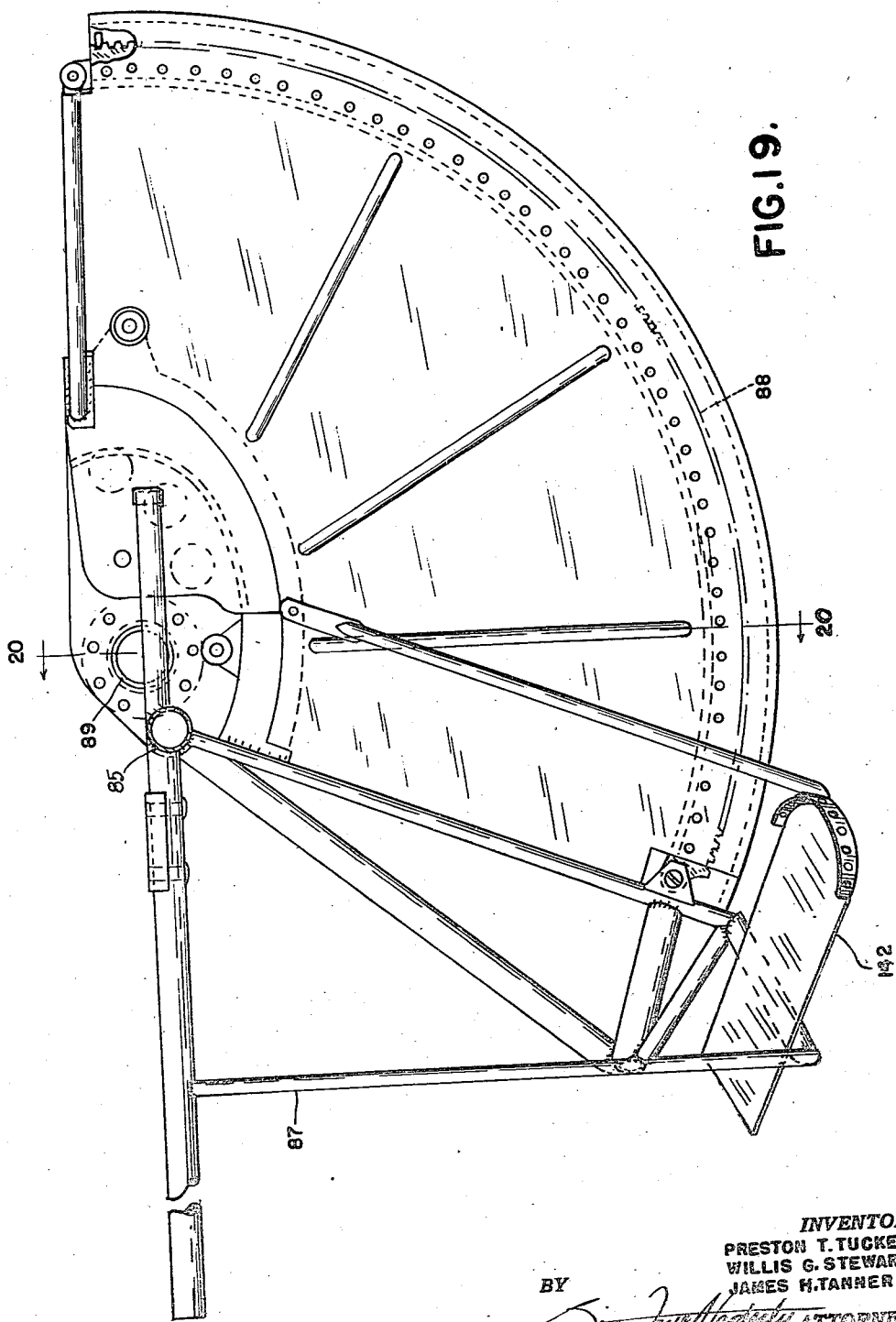

Oct. 1, 1946.   P. T. TUCKER ET AL   2,408,707
GUN MOUNTING AND CONTROL MECHANISM
Filed Aug. 16, 1941   21 Sheets-Sheet 9
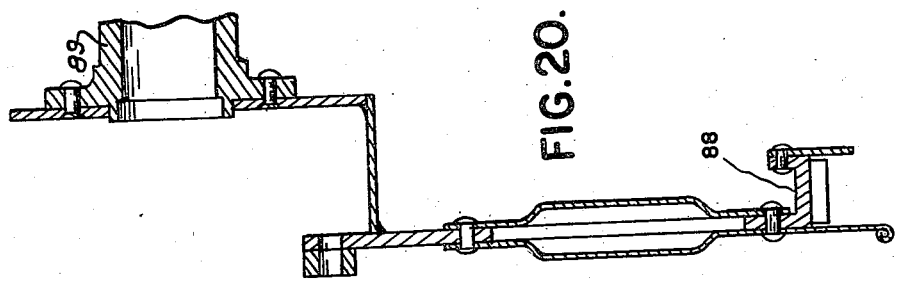
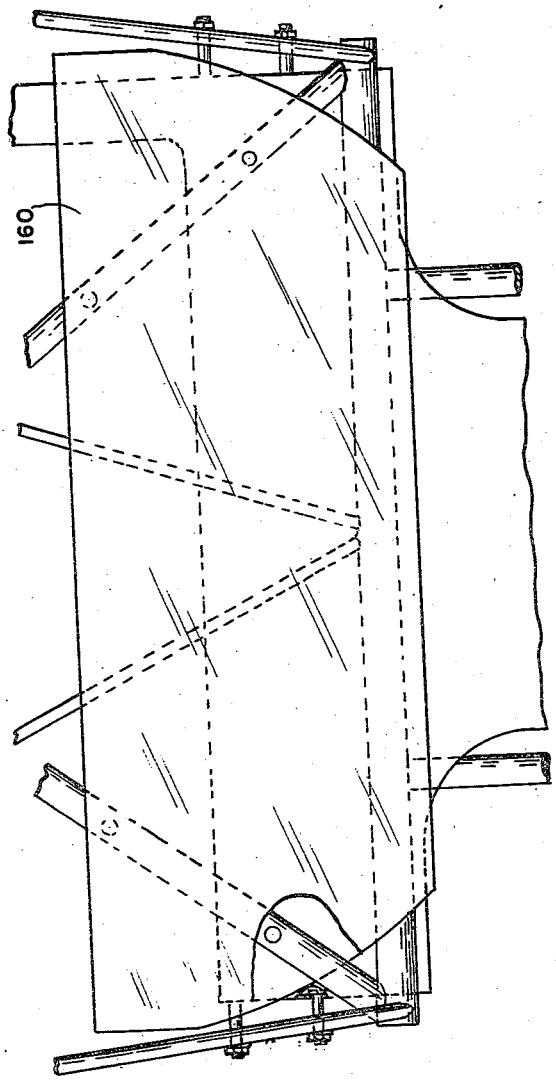
INVENTORS
PRESTON T. TUCKER
WILLIS G. STEWART
JAMES H. TANNER
BY
ATTORNEYS

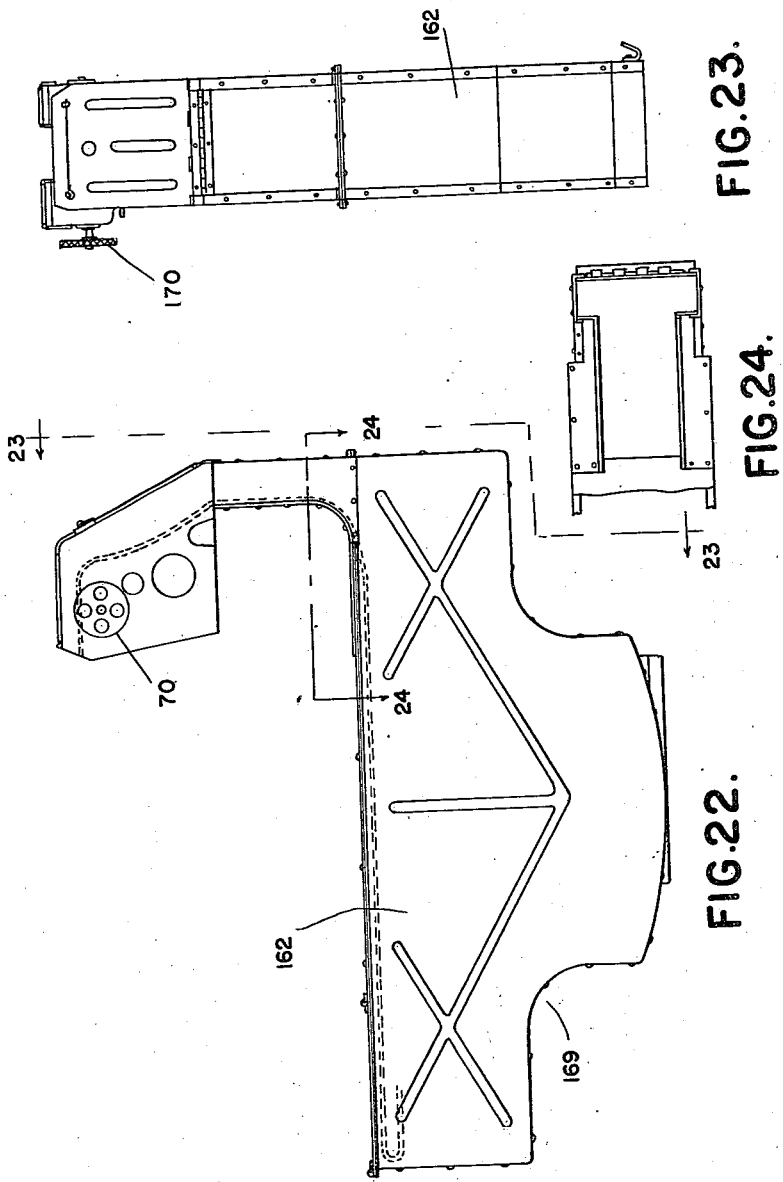

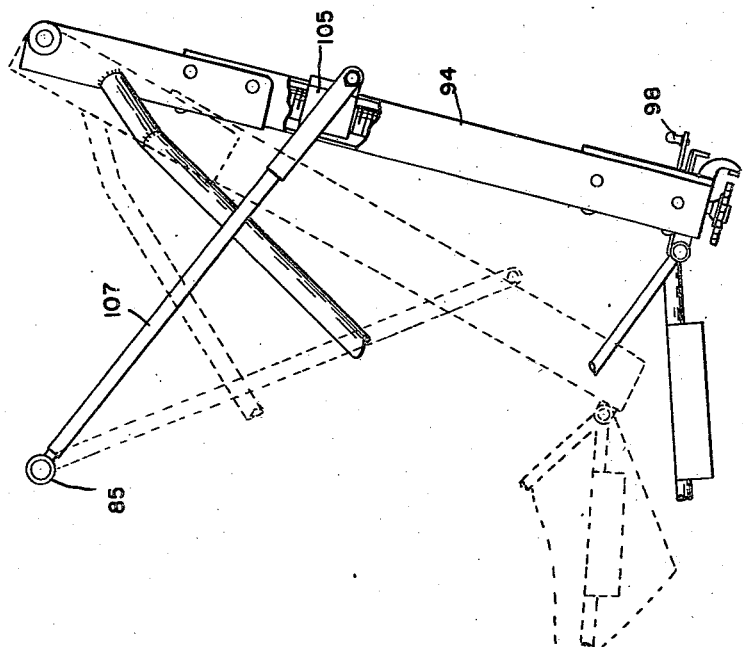
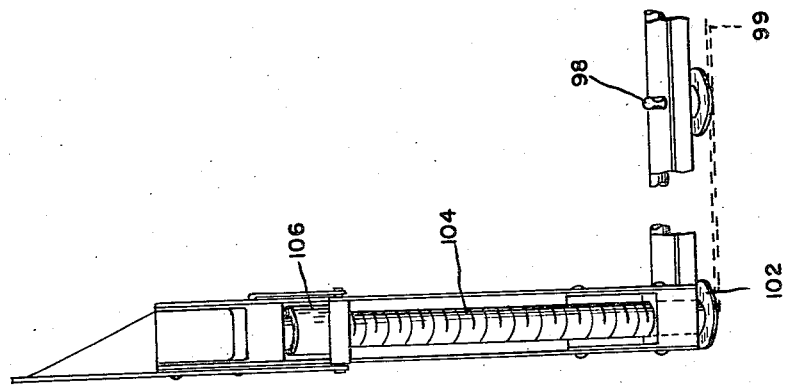

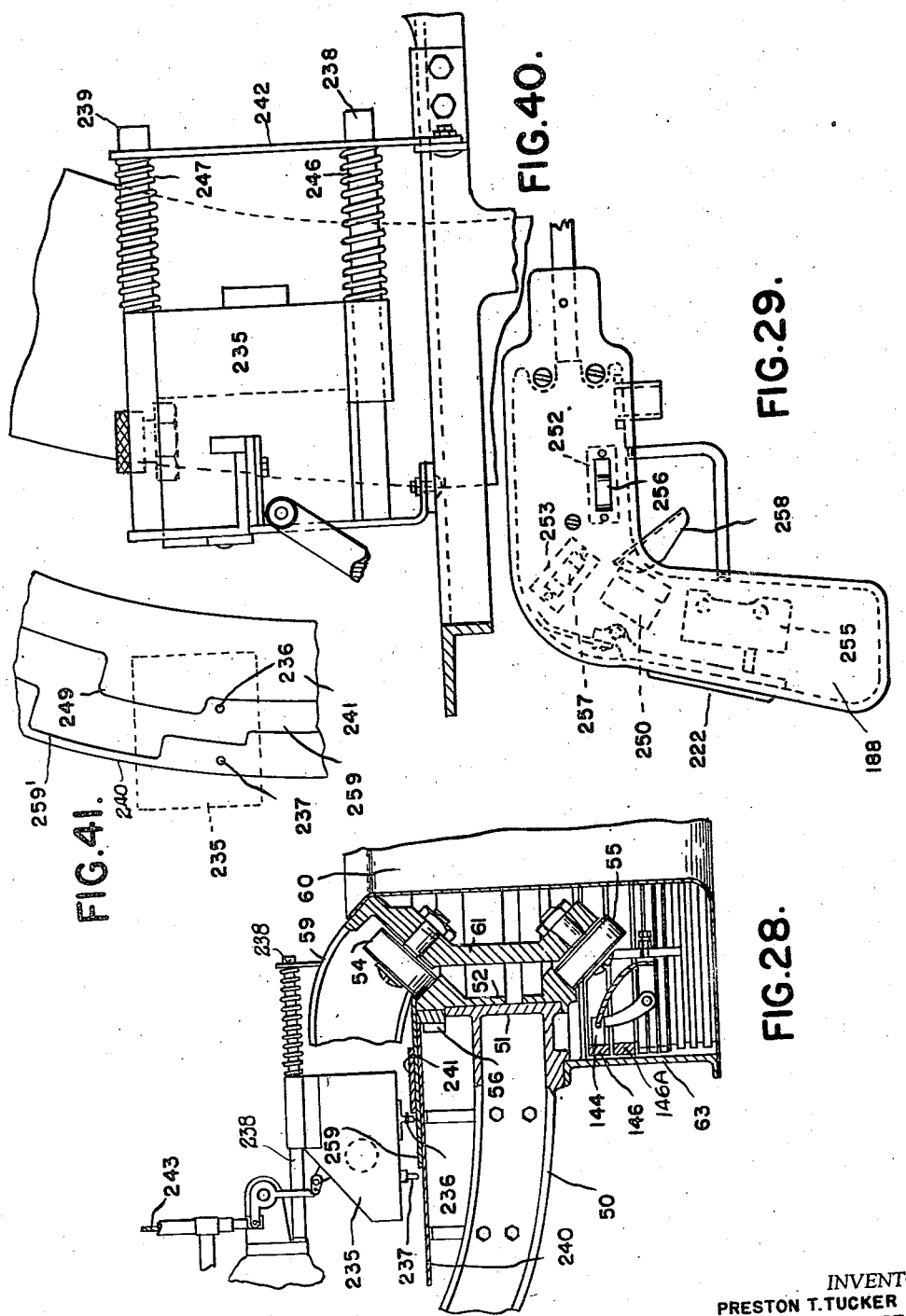

Oct. 1, 1946. P. T. TUCKER ET AL 2,408,707
GUN MOUNTING AND CONTROL MECHANISM
Filed Aug. 16, 1941 21 Sheets-Sheet 14
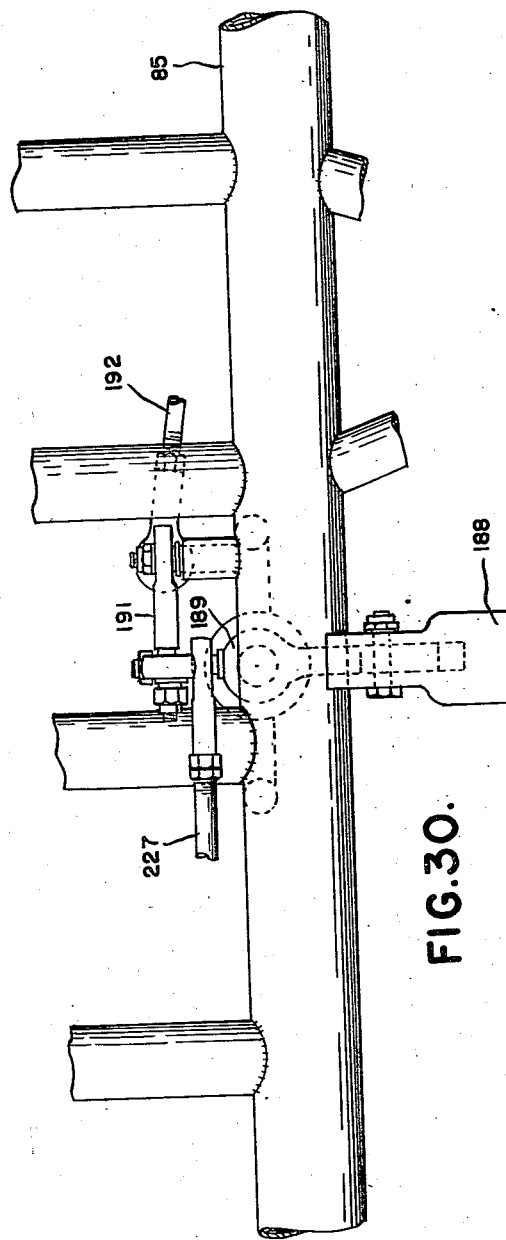
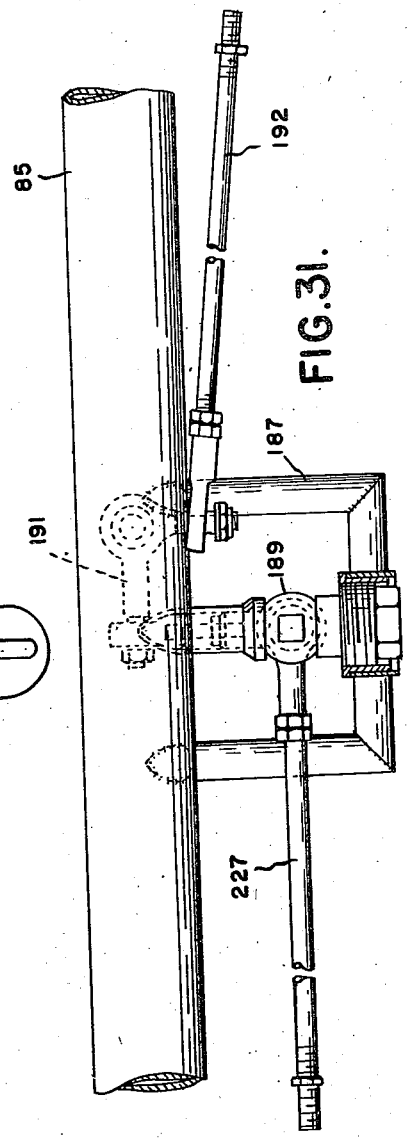
INVENTORS
PRESTON T. TUCKER
WILLIS G. STEWART
JAMES H. TANNER
BY
ATTORNEYS Oct. 1, 1946.  P. T. TUCKER ET AL  2,408,707
GUN MOUNTING AND CONTROL MECHANISM
Filed Aug. 16, 1941  21 Sheets-Sheet 15

INVENTORS
PRESTON T. TUCKER
WILLIS G. STEWART
JAMES H. TANNER
BY
ATTORNEYS

Oct. 1, 1946.   P. T. TUCKER ET AL   2,408,707
GUN MOUNTING AND CONTROL MECHANISM
Filed Aug. 16, 1941   21 Sheets-Sheet 17

INVENTORS
PRESTON T. TUCKER
WILLIS G. STEWART
JAMES H. TANNER
BY
ATTORNEYS

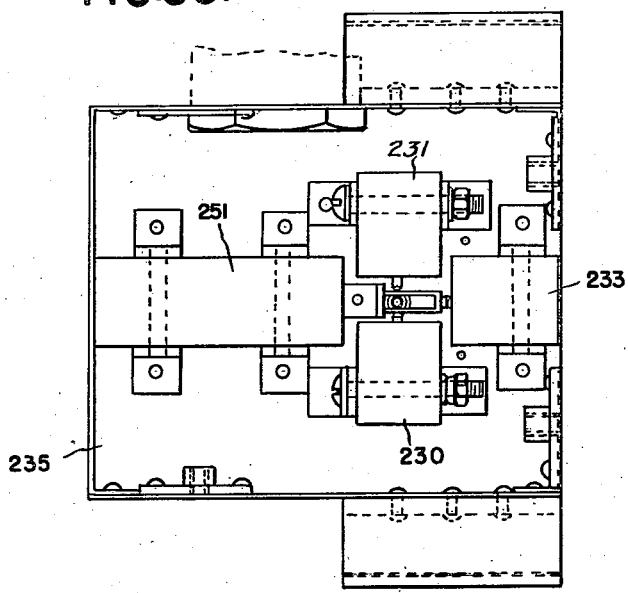
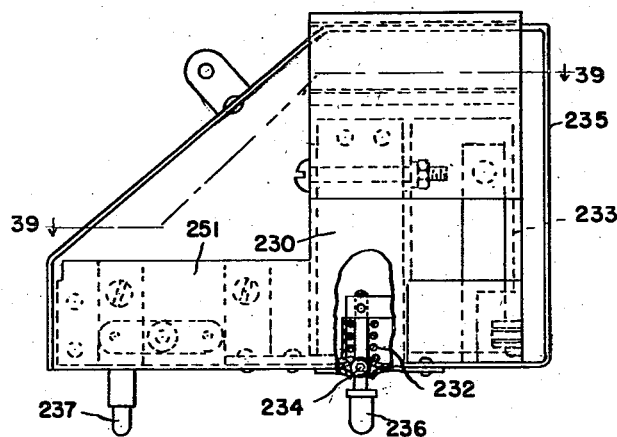

Oct. 1, 1946.   P. T. TUCKER ET AL   2,408,707
GUN MOUNTING AND CONTROL MECHANISM
Filed Aug. 16, 1941   21 Sheets-Sheet 20
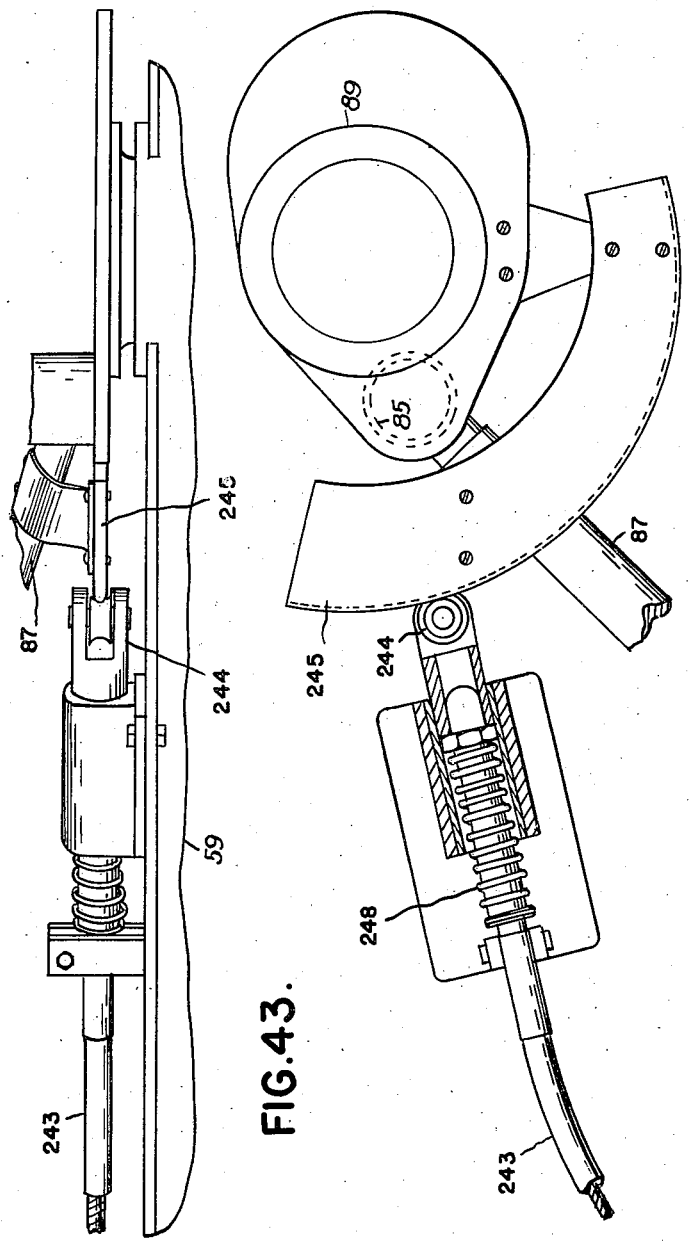
INVENTORS
PRESTON T. TUCKER
WILLIS G. STEWART
JAMES H. TANNER
BY
ATTORNEYS Oct. 1, 1946.   P. T. TUCKER ET AL   2,408,707
GUN MOUNTING AND CONTROL MECHANISM
Filed Aug. 16, 1941    21 Sheets-Sheet 21
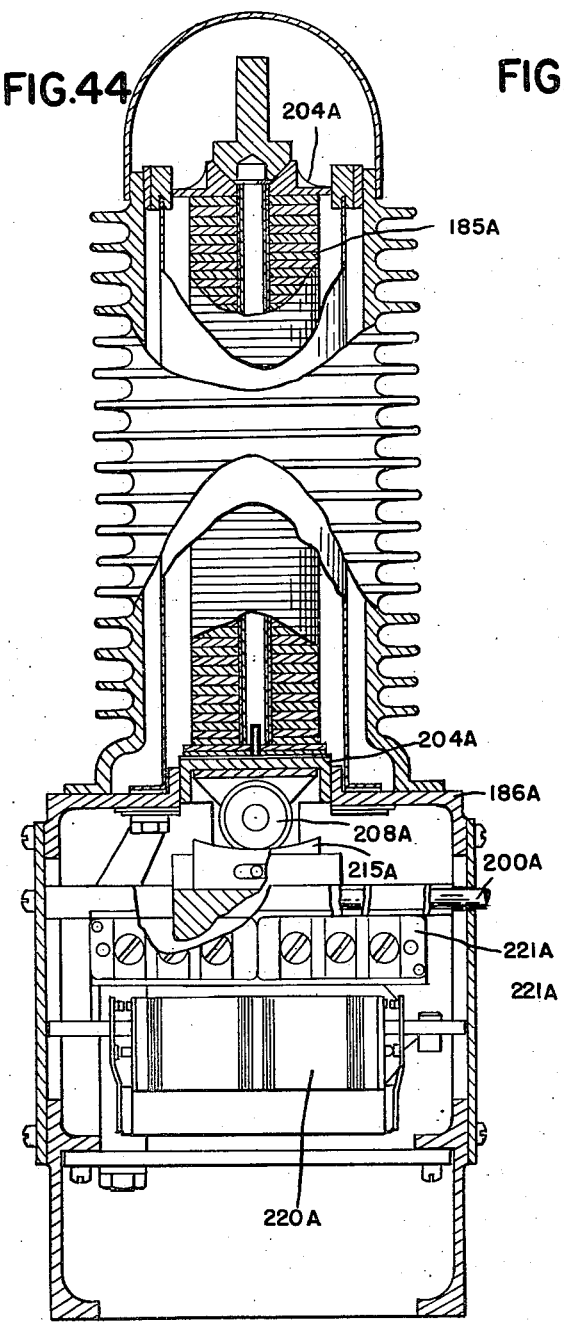
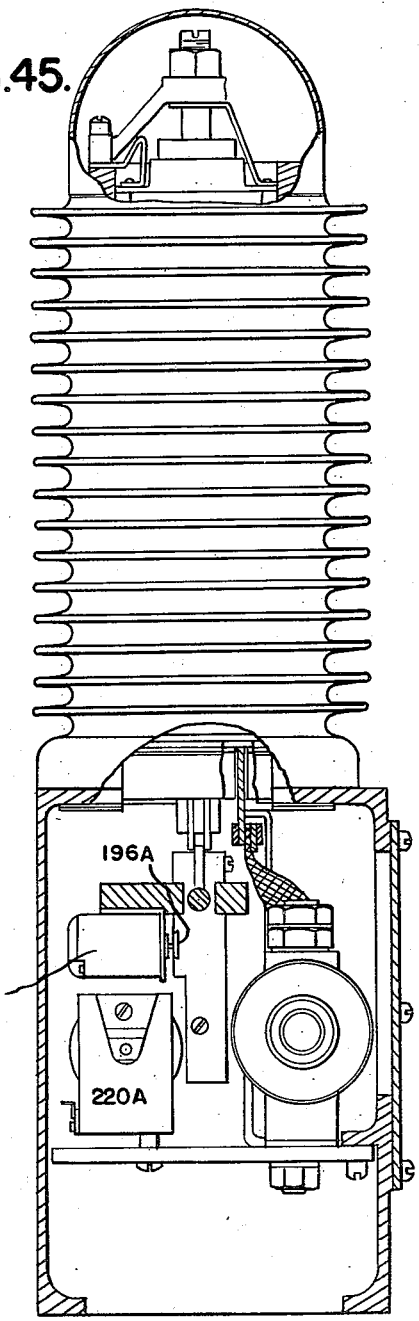
INVENTORS
PRESTON T. TUCKER
WILLIS G. STEWART
JAMES H. TANNER
BY
ATTORNEYS Patented Oct. 1, 1946

2,408,707

UNITED STATES PATENT OFFICE 2,408,707

GUN MOUNTING AND CONTROL MECHANISM

Preston T. Tucker, Detroit, Mich., and Willis G. Stewart and James H. Tanner, New York, N. Y., assignors to Tucker Aircraft Corporation, Detroit, Mich., a corporation of Michigan Application August 16, 1941, Serial No. 407,108

17 Claims. (Cl. 89—37.5)

This invention relates to power-operated mountings and fire control mechanism for guns. While disclosed in connection with power-operated turrets designed particularly for aircraft installation, it will be recognized that the principles of the present invention are equally applicable to installations not only in vehicles of all types, but also to such installations as stationary gun emplacements and the like.

A primary object of the present invention is to provide an improved automatic supervisory or over-control system, primarily electrical in character and incorporating very simple, positive and reliable fire interrupting and traverse and elevation stop mechanisms, so arranged and constructed as to prevent physical interference between the guns and any part of the fuselage, or other support upon which the turret is mounted, and also acting to prevent firing the guns in a manner to hit any part of the airplane, or any other part desired to be protected from the fire of the guns.

A further important object comprehended by the present invention is to provide such improved automatic supervisory control means which positively prevents the gunner from so moving the guns as to strike them against any part of the airplane, or other support upon which the turret is installed, yet which does not interfere with normal free movement of the guns in all other directions, and enables their muzzles to be moved at all times into close proximity to the fuselage or other support, while preventing actual contact.

A further object is to provide such a fire interrupting mechanism which is arranged to be adjusted at will to change the fire pattern determined thereby, the system being so arranged that after the gun moves beyond or away from the part protected by the interrupter mechanism, firing is resumed, and the arrangement, further, being so designed that the fire pattern traces very closely the outlines of the protected parts.

Another important object of the invention is to provide a power-operated gun control mechanism which enables very rapid gun movement, which maintains the gunner constantly in position for easy and accurate sighting, and in which the mechanism is so arranged that the entire control, both of the movement and speed of movement of the gun or guns, is effected by means of a simple centralized control member, which may be of pistol grip form (although its precise form is of course a matter of choice). It is also an object to mount such control member conveniently to the hand of the gunner, in such manner that it is easily and quickly movable in all directions to control the direction and speed of movement of the guns.

A further object, related to that last stated, is to provide such a centralized control agency which incorporates simple and naturally-positioned trigger mechanism for controlling the firing of the gun or guns.

Another object is to provide such a centralized control device arranged so that the direction of movement thereof corresponds to and determines the direction of movement of the guns, while the extent of deviation of the control member from a normal centered position of no movement, determines the rate of traverse and/or elevation of the guns.

Still another object which should be particularly noted is to provide a turret assembly incorporating the foregoing and other advantages, which is very light and strong in proportion to its size, equipment, armament and ammunition capacity.

Another object is to provide an improved adjustable seat construction for the gunner, so designed and arranged that while it occupies very little space, it is of a very comfortable shape which militates against fatigue, the movable seat supporting mechanism being so interconnected with the traversing and elevating mechanism for the guns that the gunner moves with the guns at all times and is able to keep his eye on the sight without effort.

Still another object is to provide such a turret assembly which despite its very compact size, may be entered from below, and which is also provided in its upper portion with an improved quick-acting crash exit.

Another object is to incorporate in such a turret improved hand operating means for the traversing and elevating mechanism, conveniently accessible to and operable by the gunner in event of power or other failure, to enable continued operation of the guns under such conditions.

A further object is to provide an improved transparent articulated slide assembly, freely movable in the body of the turret as the guns are elevated and depressed, and so arranged that the sliding sections are directed down into the space below the turret as the guns are depressed, as a result of which such sections do not occupy any useful space inside the turret itself.

An object related to that last stated is to incorporate in the slide assembly an improved reversible sight window, both sides of which may be easily and quickly cleaned from inside the turret.

Still another object is to provide an improved electrical control system for a gun mounting and fire control assembly of the general character indicated.

Other objects and advantages will be apparent from the following description, wherein reference is made to the accompanying drawings illustrating preferred embodiments of the invention and wherein similar reference numerals designate similar parts throughout the several views.

In the drawings:

Fig. 4 is a front elevational view of the framework for the sheathing dome.

Fig. 5 is a plan view thereof, partly broken away.

Figs. 6 to 15 inclusive, and 15A are detailed sectional views taken substantially on the lines correspondingly designated in Fig. 4, and looking in the direction of the arrows.

Fig. 16 is a side sectional elevational view, upon a larger scale, of a part of the shutter slide assembly.

Fig. 17 is an elevational view of such an assembly, from the interior of the turret.

Fig. 8 is a fragmentary horizontal sectional view showing in plan a part of the framework of the turret, and partly showing the gun supporting means and the rocking trunnion which carry the guns and the gunner's seat.

Fig. 19 is a detailed elevation partly in section showing a part of the framework and the actuating sector gear for the trunnioned gun and seat support.

Fig. 20 is a sectional view taken substantially on the line 20—20 of Fig. 19, and looking in the direction of the arrows.

Fig. 21 is a front elevational view of the front ammunition box.

Fig. 22 is a front elevational view of the rear ammunition box, and a part of the ammunition feed mechanism.

Fig. 23 is a side elevational view thereof taken substantially as indicated by the line and arrows 23—23 of Fig. 22.

Fig. 24 is a horizontal sectional view taken substantially on the line 24—24 of Fig. 22 and looking in the direction of the arrows.

Fig. 25 is a front elevational view of a part of the adjustable seat supporting mechanism, partly broken away.

Fig. 26 is a side elevational view thereof, also partly broken away.

Figure 27:
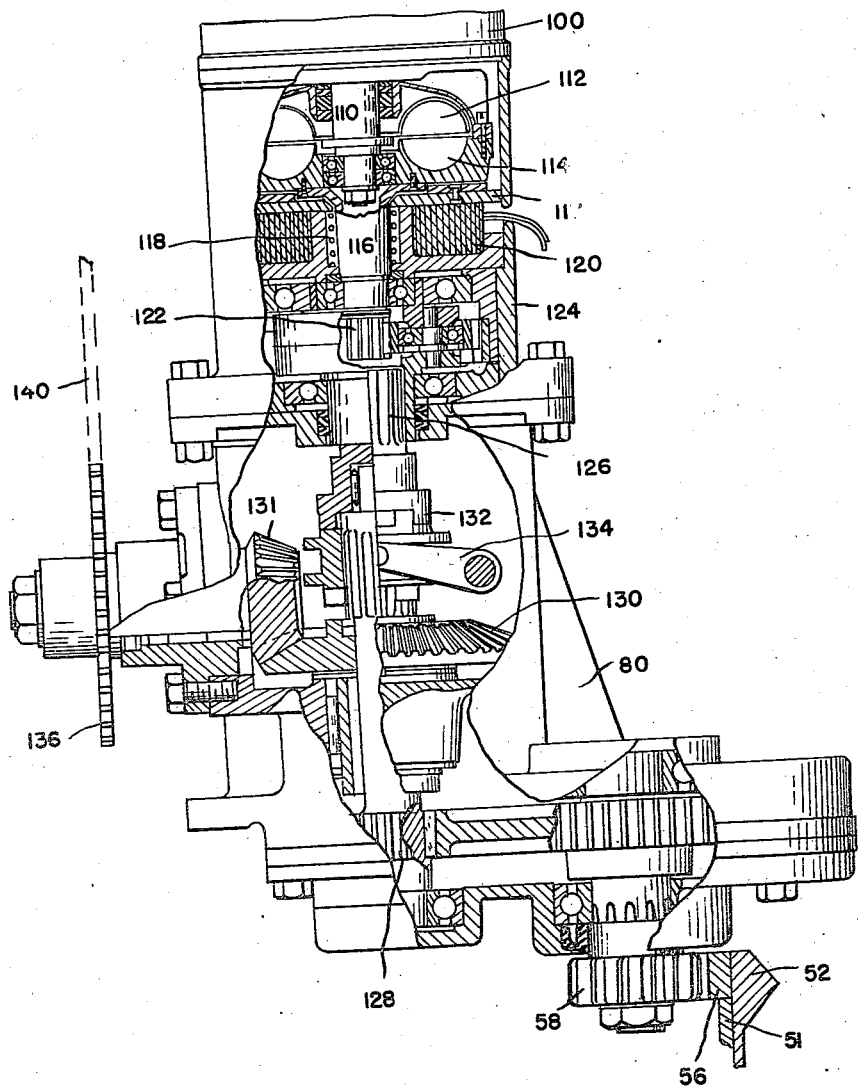

Fig. 27 is a view partly in section and partly in side elevation of the traverse drive mechanism.

Fig. 28 is a detailed radial fragmentary sectional view of a lower portion of the turret assembly.

Fig. 29 is a side elevational view of the control handle.

Figs. 30 and 31 are top plan and front elevational views respectively of the mounting means for the control handle, showing parts of the connecting means whereby communication is provided between the control handle and the parts actuated thereby.

Figure 32:
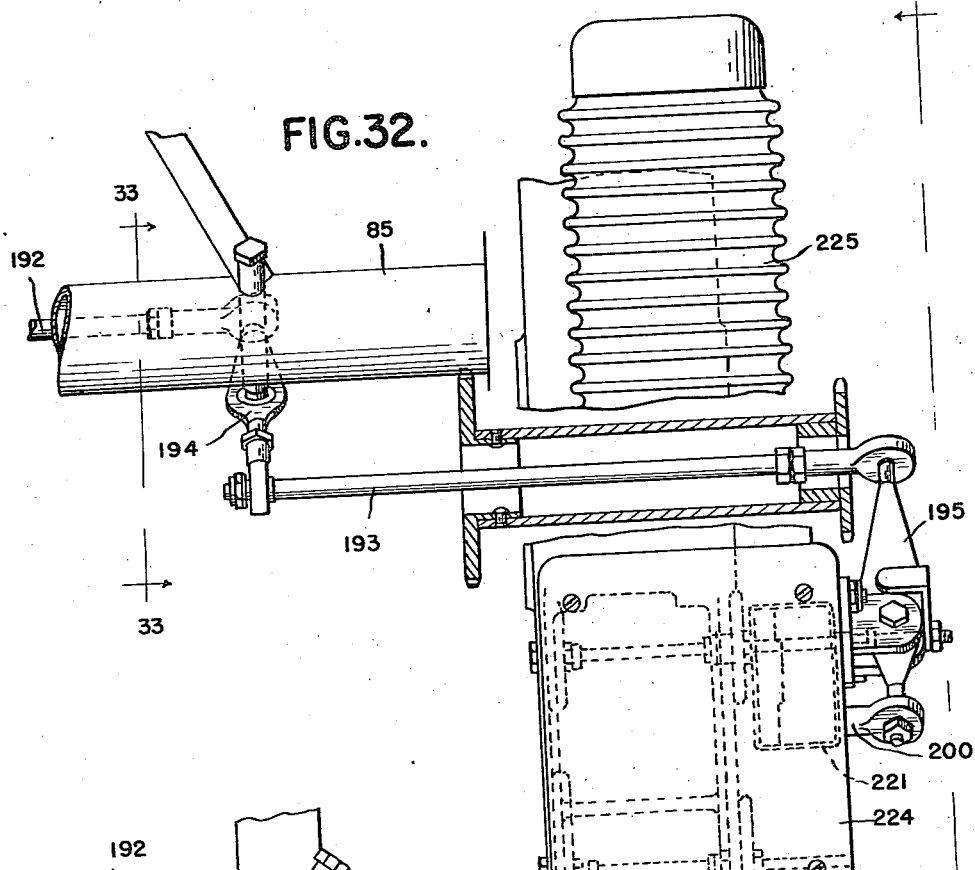

Fig. 32 is a view partly in elevation and partly in cross section of a part of the control mechanism for elevational movement of the gun mounting, also showing the elevation control switch box.

Figure 33:
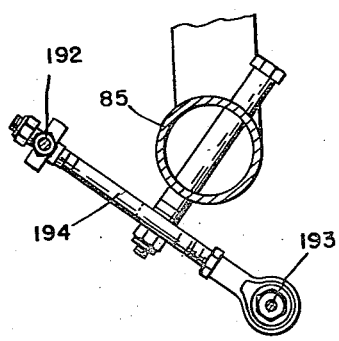

Fig. 33 is a cross section taken on the line 33—33 of Fig. 32 and looking in the direction of the arrows.

Figure 34:
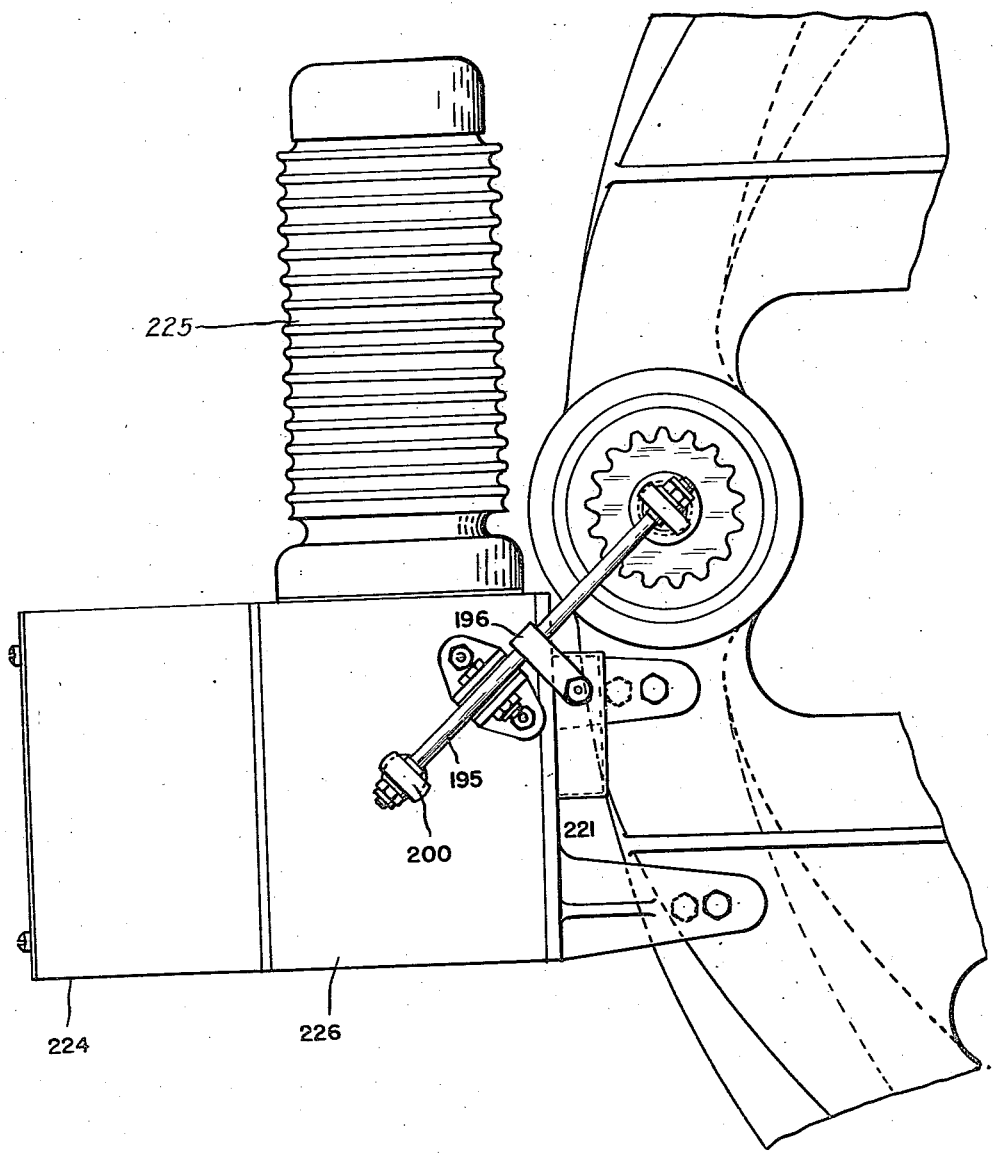

Fig. 34 is a side elevational view taken substantially as indicated by the line and arrows 34—34 of Fig. 32.

Figure 35:
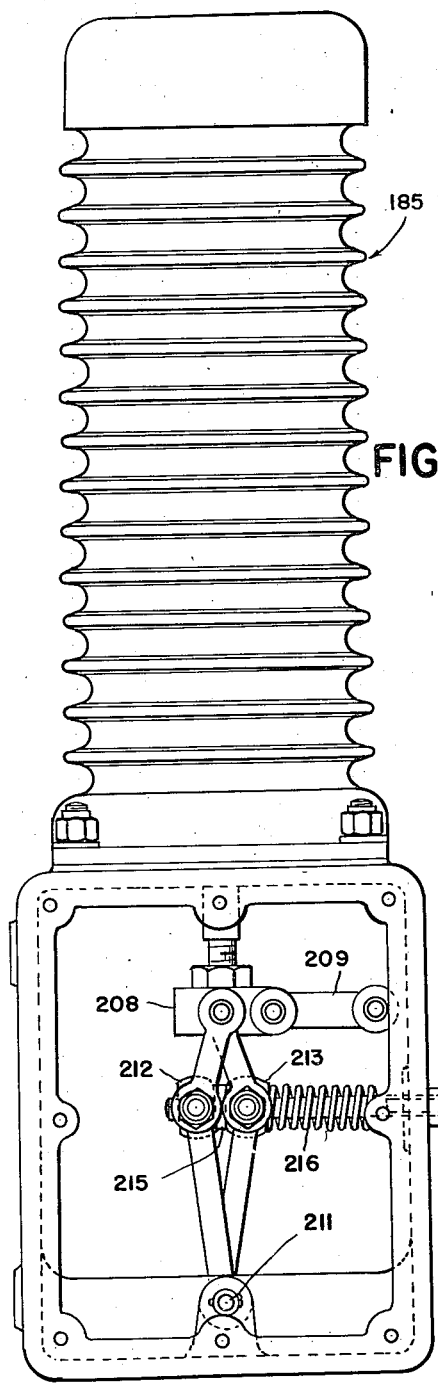

Fig. 35 is an elevational view of one of the resistance units for controlling the speed of the traversing and elevating motors, one of the covers being removed from the actuating linkage box.

Figure 36:
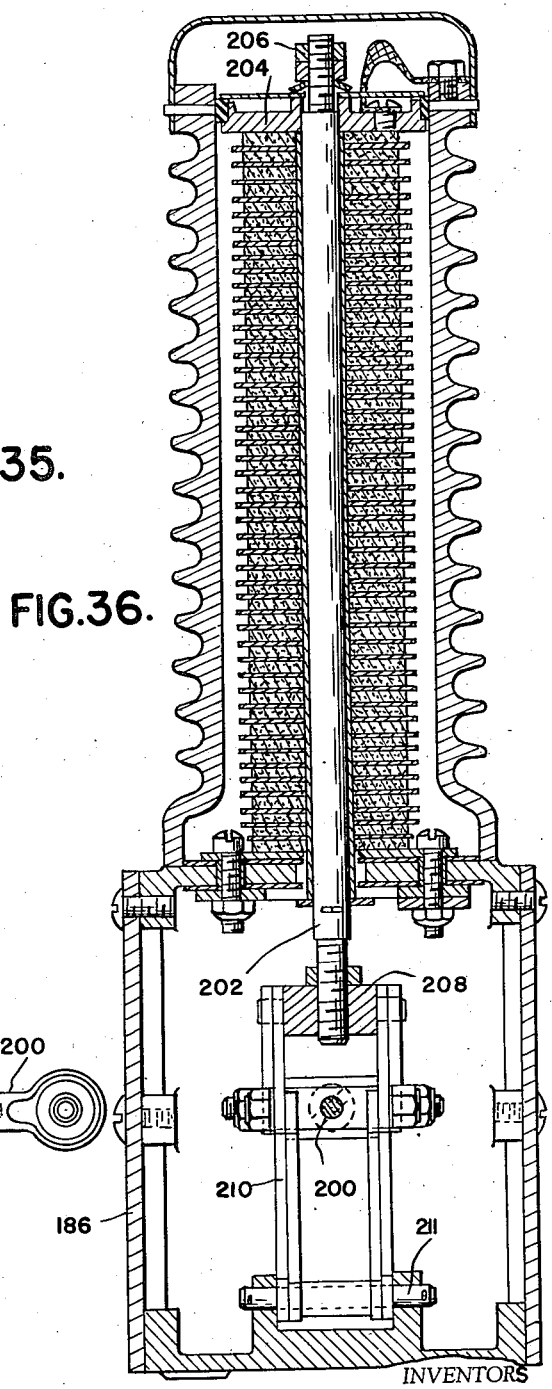

Fig. 36 is a substantially central vertical sectional view of the same taken at right angles to Fig. 35.

Figure 37:
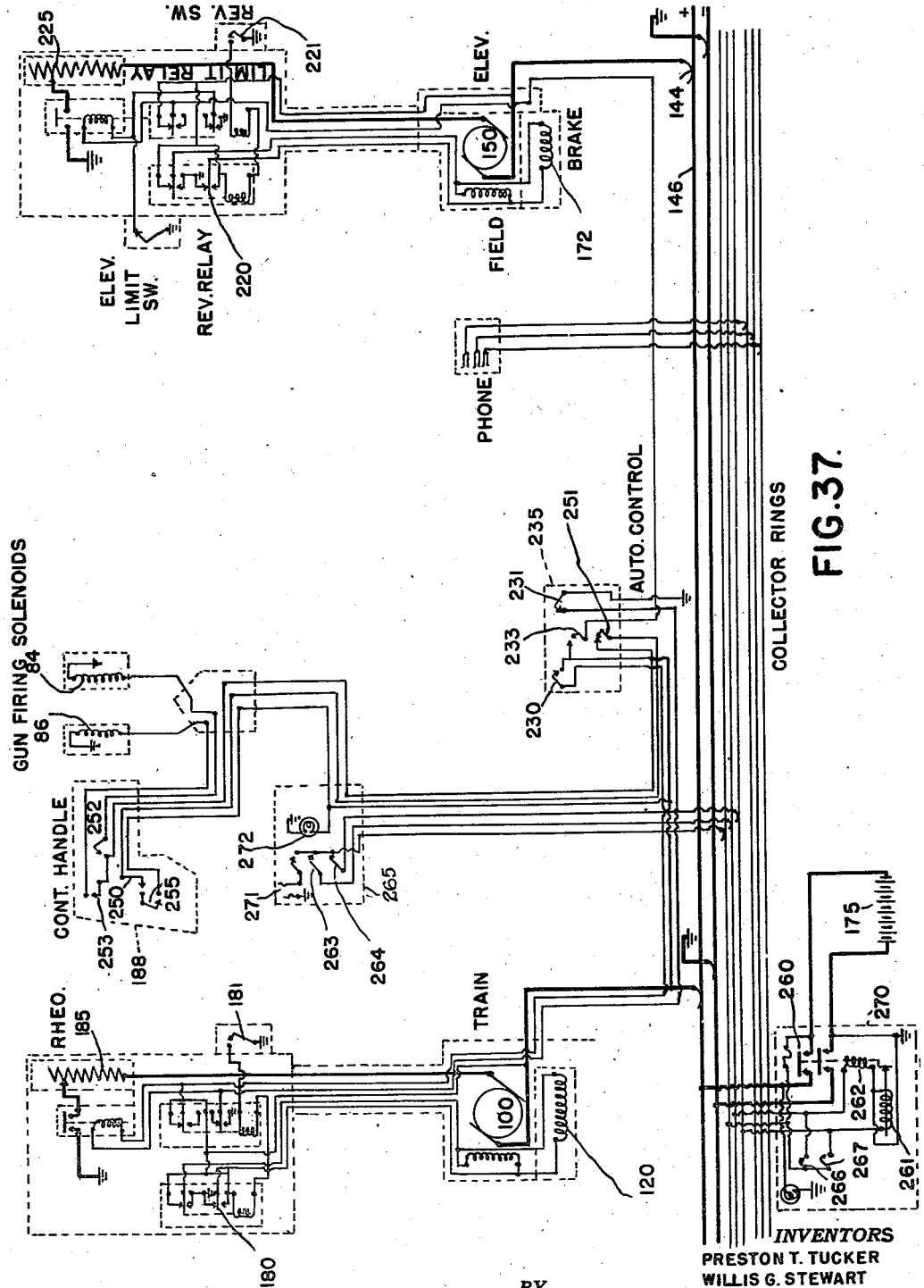

Fig. 37 is a schematic diagram of the turret control wiring and electrical elements.

Fig. 38 is a view partly in section and partly in side elevation of the automatic supervisory control switch box.

Fig. 39 is a plan view of the same with the cover removed.

Fig. 40 is a plan view of the box showing the cover in place, and illustrating the supporting and actuating means for the box.

Fig. 41 is a fragmentary diagrammtic plan view of a part of the automatic control cam assembly.

Fig. 42 is a fragmentary side elevational view of a part of the elevation-responsive supervisory control system, taken as indicated by the line and arrows 42—42 of Fig. 18.

Fig. 43 is a plan view thereof on a larger scale.

Figs. 44 and 45 are views similar to Figs. 35 and 36 respectively, showing a somewhat modified motor control assembly.

General construction of supporting portions

While the physical construction of supporting and bracing portion is of course subject to variation, a preferred and effective assembly is shown in the drawings.

Figure 1:
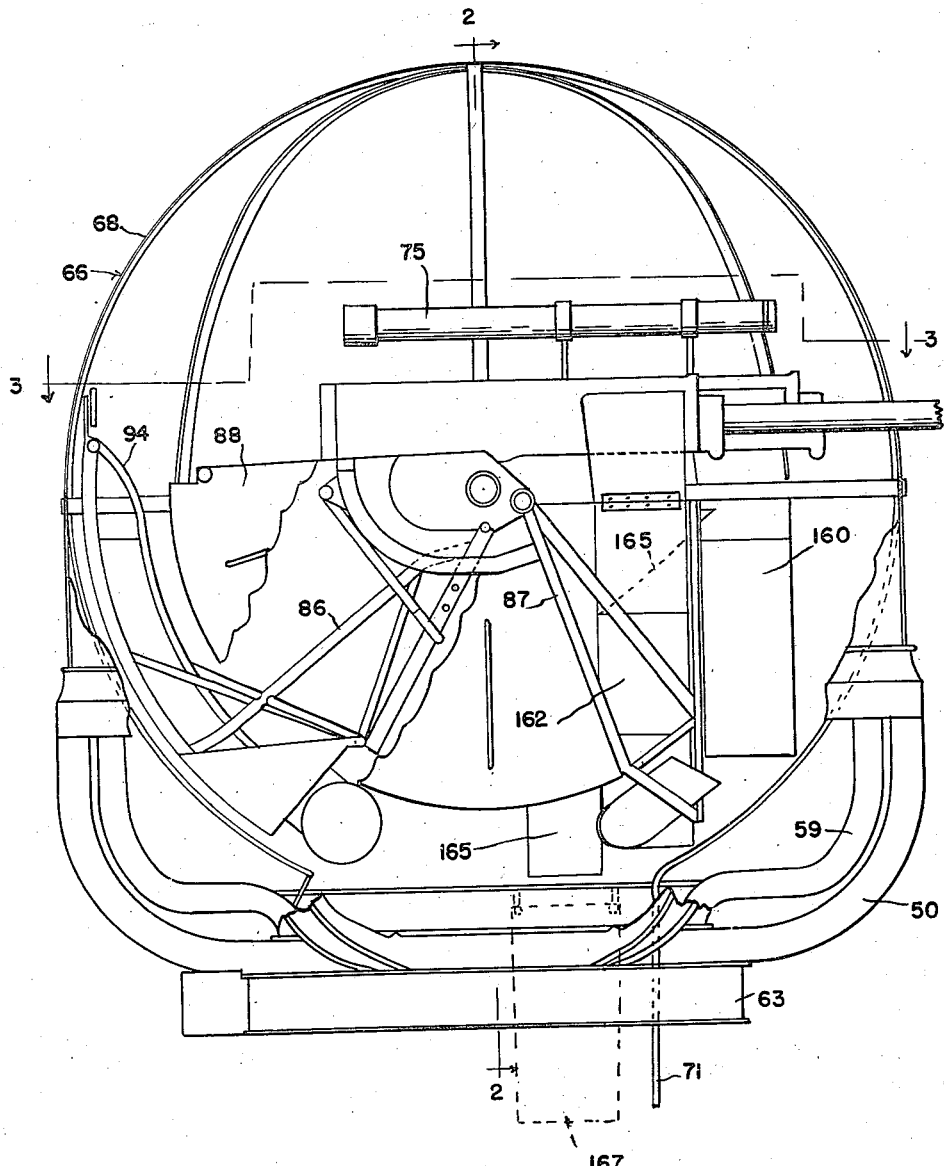
Fig. 1 is a view partly in side elevation and partly in substantially diametric vertical section of a turret incorporating the principles of this invention.
Figure 2:
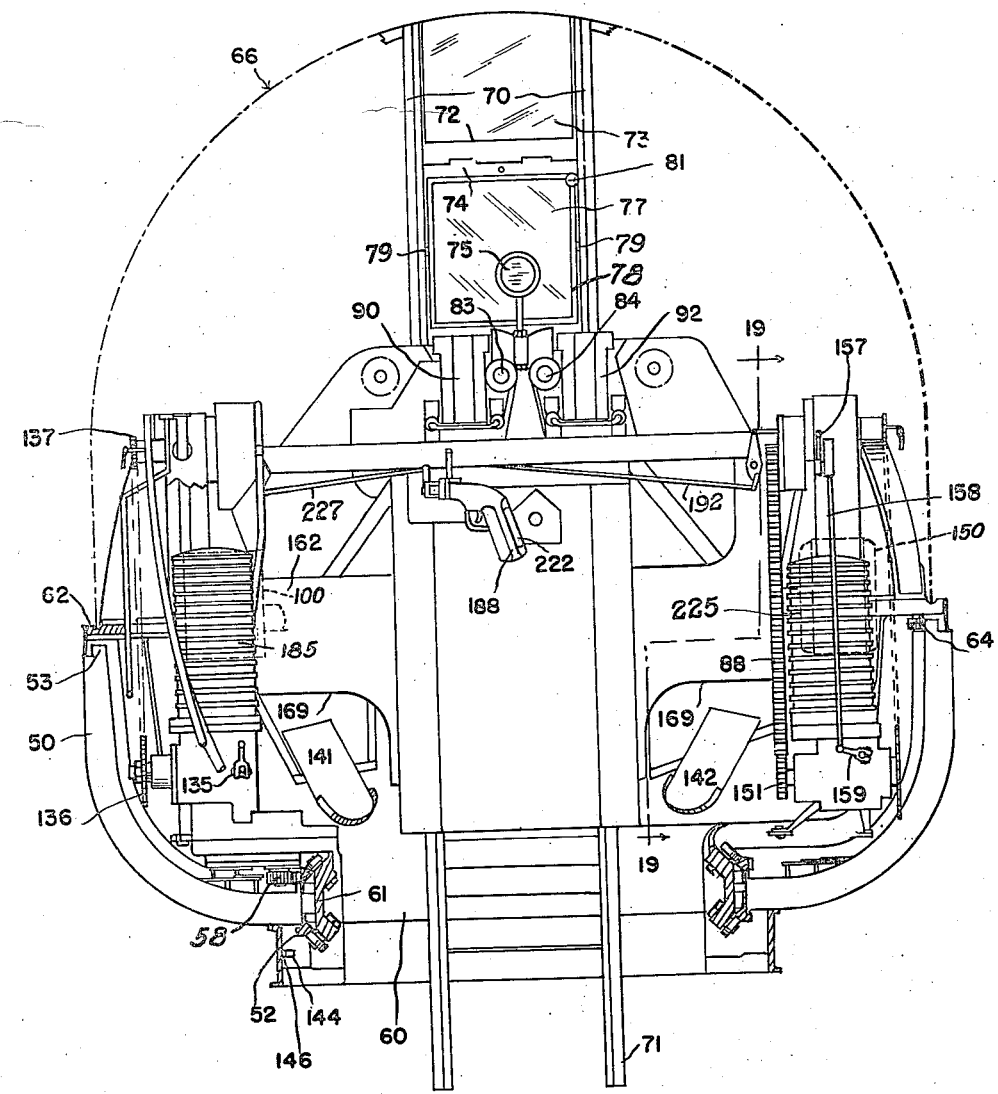
Fig. 2 is a transverse vertical section thereof taken substantially on the line 2—2 of Fig. 1, and looking in the direction of the arrows.
Figure 3:
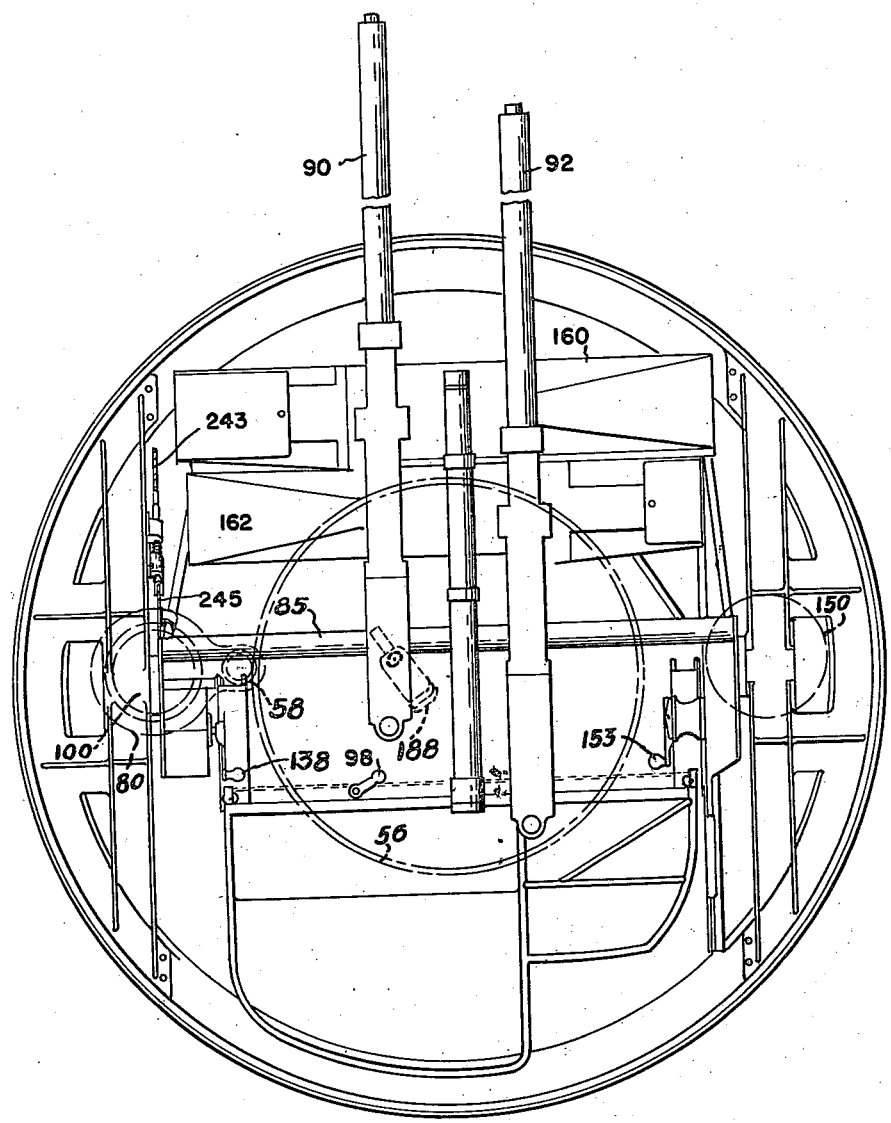
Fig. 3 is a horizontal sectional plan view taken substantially on the line 3—3 of Fig. 1, and looking in the direction of the arrows.

Reference character 50 designates the skeletonized main frame or basket. This may be integrally cast of aluminum or other light metal, and is fixedly attached to the fuselage or other supporting means. Corradiate and upwardly curved arms forming part of the supporting basket terminate at their inner ends in a ring 51 which supports an annular track member 52, having angularly sloping upper and lower surfaces over which roll the supporting rollers 54—55 for the rotating sub-frame or inner basket 59. The inner basket carries all movable parts of the turret mechanism. The annular space 60 inside the roller-supporting bottom ring 61 of the inner basket permits access to the interior of the turret from below. A top ring 62 carried by the inner basket overlies the top of the stationary outer basket, which also carries a complete annular top-portion 53, against the inner face of which run thrust rollers 64, dependingly supported by the sub-frame top ring 62, as best shown in Figure 2.

Sub-frame top ring 62 carries a skeletonized supporting structure generally designated 66, which in turn carries sheathing 68, formed of transparent plastic or the like. Substantially along a great circle, the plastic sheathing is interrupted to leave a slot-like opening through which the guns may move during elevation and depression thereof, the sides of such opening being defined by tracks 70 in which are slidable a plurality of hingedly articulated light metal frames as 72. Each of these which is within the gunner's range of vision is provided with a transparent plastic window 73. One of the slide frames, designated 74, which is that in line with the telescopic gun sight, generally designated 75, is provided with a reversible window 77, mounted in a subframe 78 which is rotatable in the slide frame 74, such mounting being provided by trunnion bearings 79. A thumb screw 81 enables securing the reversible window flush with the remainder of the slide assembly and with either face to the interior. By reversing the window, the gunner can easily clean both surfaces.

The guns, generally designated 90, 92, project through apertures (undesignated) in one of the articulated slides, also undesignated, and by reason of this connection, the vertical movement of the guns moves the slide assembly in the tracks. The guns need not move beyond the zenith, since this is accommodated by rotating the turret.

At their lower ends, the tracks 70 curve downwardly and project through and below the opening 60, the downwardly projecting portion of the track being designated 71. When the gun is depressed, the articulated sections travel through the extension section 71.

Gun mounting

In the illustrated construction in Figs. 1, 3, 18, 19 the mountings are arranged to accommodate the standard 50-caliber Browning-type machine guns, which are shown as provided with a standard type of solenoid operated electrical firing mechanism, generally designated 84. The gun support assembly, carried by the rotatable inner basket, is formed of welded steel tubing, the entire assembly being carried and rotatable about a transverse axis provided by the tubular cross brace 85. The support assembly is generally designated 87, and carries rigidly attached thereto at one side a skeletonized sector gear 88, by which it is actuated for vertical gun movement. The gun support assembly is trunnioned in the rotating basket by means of stub shafts 89. A triangularly shaped brace 89' formed of tubular members may be secured to the main cross brace 85 to increase the rigidity of the latter member.

While in the same horizontal plane, the guns are staggered in such manner that the left gun projects forwardly farther than the right gun. The guns may thus be positioned closer together than would otherwise be possible, the discharge of the links and cartridge casings being between the guns in a longitudinal line.

The ammunition box 160 for the left-hand gun is located in front of and somewhat higher than the ammunition box 162 for the right-hand gun, the left-hand gun being set up for ammunition feed from left to right, and the right-hand gun for right to left feed. Links and cartridges discharged into the space between the guns are carried downwardly through a chute 165 to a box 167 which projects downwardly from the turret assembly through and occupies a part of the space 60. The rear ammunition box 162 (see Figs. 2 and 22) is cut out, as indicated at 169, to accommodate the foot rests 141, 142. The portion of the feed mechanism appurtenant the ammunition box is shown only in connection with the rear box, in Fig. 22, generally designated 170, and it will be appreciated by those skilled in the art that equivalent provision is made for feed from the front box.

Seat support

Also carried by the swingable gun support assembly 87, as by the struts 86, is the seat assembly 94 (Fig. 26), which swings bodily and synchronously with elevation and depression of the guns, to maintain the seat in such position that the gunner's vision is constantly maintained without effort in line with the telescope sight 75.

The initial positioning of the seat with respect to the sight is adjustable by means of a hand crank 98 (Fig. 3), conveniently positioned adjacent the seat and actuating, through chain 99 and sprockets 101, 102, a pair of worms 103, 104 along which travelers 105, 106 are slidable Each traveler is connected by a link 107 to the cross brace 85. The links are articulated at both ends, but of fixed length, so that movement of the traveler swings the seat frame 94 bodily in a path to simultaneously raise and move it closer to the sight, or lower and move it farther from the sight.

Power traverse mechanism

The ring 51 of the outer basket carries on its periphery a ring gear 56. A pinion 58 (Figs. 2 and 27) meshing with the ring gear reacts against the latter to turn the turret. Pinion 58 is the final gear of a reduction train housed in a gear casing 80 attached to the rotating basket frame of the turret and driven by an electric motor 100. The construction of the motor-gear reduction assembly is best shown in Figures 27, 28. As there shown, the motor shaft 110 drives the impeller 112 of a fluid coupling of the hydrodynamic type. The turbine 114 of the fluid coupling drives an intermediate shaft 116, to which is attached a friction disc 117 engageable with the turbine to act as a brake when actuated by the solenoid 120. Reduction gearing 122 is also incorporated in the common housing 124 which encloses the fluid clutch and magnetic brake assembly. A second intermediate shaft 126 conveys the power to the additional reduction gearing 128 within the casing 80, through which gearing the drive is conducted to the pinion 58 to turn the turret.

A bevel gear 130 is normally loose upon the shaft 126, but is adapted to be clutched thereto by means of a splined dog clutch 132, actuable by means of a handle 135 through the agency of a rock shaft and yoke 134. A bevel gear 131 meshes with gear 130 and is carried by a shaft which projects from the exterior of the casing to carry the sprocket wheel 136. A chain 140 extends upwardly from the sprocket wheel to a second sprocket 137 (Figs. 2 and 3) actuable by means of a hand crank 138, located in a position convenient to the gunner. It will be seen that in event of a power failure, or the development of any other condition which might interrupt the power drive, the turret may be turned by hand, after first engaging the clutch 132. The operating lever 135 for clutch 132 is located in a position convenient to the gunner's left foot, and may be operated by a kick, although it will be noted that this lever is also so positioned that it is virtually impossible to kick it accidentally.

Power for operation of the training motor 100 is supplied through a fixed slip ring 146 and rotating brush 144 (Fig. 28), the ring being carried by a fixed supporting ring 63 attached to the main frame basket 59 at the base of the turret. The other side of the motor circuit is adapted to be grounded through a control circuit which will presently be described. The annular support 63 will be seen to carry other slip rings, for example, 146A, adapted to be engaged by brushes rotating with the turret and adapted to take off current for the various electrical appurtenances and controlling devices.

Power elevating mechanism

The power drive for vertical gun movement is provided by a similar assembly powered by an electric motor 150, which actuates through similar clutch means and gear reduction means, a pinion 151 (Fig. 2) meshing with the sector gear 88.

Hand elevating may also be effected by means of a crank 153 (Fig. 3) adapted to drive the pinion 151 through suitable sprocket means and a dog clutch (not shown) corresponding to the clutch 132 of the train mechanism, and operable by means of a handle 157 positioned adjacent the crank 153 and connected by means of a link 158 to the clutch actuating lever 159. The electrical connections to the elevating motor will also be described presently in connection with the controlling mechanism.

Manual traverse and elevation control

The electrical control system for both movement and firing of the guns is shown in schematic Figure 37.

The power for the motors 100, 150, and for all other electrical apparatus, is derived from a battery, designated 175, and is conveyed to the turret through the slip ring and brush mechanism located at the bottom of the turret and previously described.

Control of the direction of rotation of the elevating motor 150 is effected by a field reversing relay, generally designated 220, while speed control is effected by a carbon pile resistor 225, the details of construction of which are shown in Figures 35 and 36.

The master control assembly, shown as of pistol grip form, is mounted centrally of the turret, in a position convenient to the gunner, the handle being designated 188. The ball mounting 189 (Figs. 30, 31) will be seen to permit universal movement of the handle, which is connected by suitable linkage to relay control switches of the micro-type. The reversing relay control microswitch is designated 221, and is thrown whenever the hand control assembly is moved up or down with respect to its central position. Such movement also actuates the carbon pile resistor mechanism 225 for the elevating motor, the linkage being so arranged that the pile is compressed, to reduce the resistance, as the master control is moved either up or down from the centered position. As shown in Figures 32, 34 the switch 221 is carried upon the side of the carbon pile housing 226. A box 224 secured to box 226 serves to house the reversing relay mechanism and the limit switch relay mechanism.

The linkage connecting the hand grip master control handle and the elevating control mechanism carried by boxes 224, 226, is best shown in Figures 31, 32, 33 and 34. The universal ball mounting 189 for the handle 188 is mounted in a bracket 187 welded or otherwise attached to the cross brace 85. A forward extension of the control handle is connected to a bellcrank 191, which is in turn connected, through links 192, 193 and an intermediate lever 194, to a lever 195, rockably supported upon the side of the control box 226. One arm of the lever 195 carries a pad 196 engageable with the plunger of the microswitch 221, while the other arm of the lever is articulated to a slidable rod 200 arranged to actuate the carbon pile resistor 225. This arrangement will be seen to be such that upward and downward movement of the pistol grip handle serves to actuate the microswitch and carbon pile.

The carbon pile is composed of alternate centrally perforated discs of carbon and steel, compressible by downward movement of a plunger 202 which extends downwardly therethrough, being attached at its upper end to a movable abutment pad 204 at the top of the pile, and adjustably fixed with respect to such pad by means of lock nuts 206. The lower end of the plunger projects into the box 226, where it carries a block 208 to which are connected a pair of pantograph toggle link assemblies 210, the lower ends of which are pivoted upon a pin 211 fixed in the bottom of the box. The upper block 208 is guided by a link 209 articulated to the side of the box. Actuating slide 200 projects slidably through transverse pivot blocks 212, 213, one of which connects corresponding centrally articulated pivots of each pair of opposed similarly acting links. An abutment 215 is carried by the rod 200 between the cross members 212, 213, so that when the rod is moved either inwardly or outwardly, it engages one of the pivot blocks 212, 213, tending to fold the links to a smaller angle and so compress the pile. A spring 216 encircling the plunger 203 and bearing against the pad 213 tends to extend the pantograph and so release the pile. When the pantograph is extended, the circuit through the pile is opened, or its resistance is raised to such point that the motor is stopped.

The reversing switch 221 and reversing relay 220 are so arranged that the elevating motor 150 is constantly connected in one position or the other, no neutral position being provided. The same is true of the reversing relay 180 for the traversing motor and its switch 181. This permits virtually instantaneous reversal, the neutral or rest position being provided by the opening of the speed control carbon piles 185, 225.

The brake solenoids 120, 172 hold the brakes of their respective motors released while current is being supplied thereto, being connected in parallel with the fields of the motors. When current to either motor is interrupted, its brake is therefore applied by its brake spring as 118 (Fig. 27).

The control mechanism for the traversing motor 100 is similar to that for the elevating motor, and detailed redescription of many of the parts is unnecessary. The corresponding carbon pile controller 185 is actuable concurrently with a similar field reversing micro-switch 181, the latter being actuated as the handle goes over center, and linkage being provided for actuating these parts in a generally similar manner but in response to lateral movement of the control handle. The link 227 connected to the control handle assembly is movable longitudinally by lateral movements of the handle, and this movement is so related to the connections to the field of the motor, and the traversing mechanism, that right and left hand movements of the handle result in corresponding right and left hand traverse of the rotating cage.

Automatic stop motion

To prevent physical interference between the guns and adjacent fuselage or other supporting portions against which the guns might be struck, limit switches 230, 231 are incorporated in the field circuit control system for the traversing motor, and a limit switch 233 is incorporated in the field circuit control system for the elevating motor 150 as shown in Figures 28 and 37 to 40. All of these limit switches are housed in an automatic control switch box or carriage 235 carried by and rotatable with the inner cage 59, so that the angular positions of the box with respect to the fixed cage is dependent upon the azimuth or horizontal setting of the guns.

The switch box 235 is also movable horizontally in a substantially radial path upon its mounting, which consists of a pair of slide bars 238, 239 disposed radially of the turret structure. Springs 246, 247 trapped on the slide bars and reacting against the box and against the bracket 242 urge the box to the left, as viewed in the drawings, and take up all slack in the box actuating mechanism. The box is moved along the bars by vertical movement of the guns, and the movement of the box is at a constant and predetermined ratio with respect to the gun movement. The distance from the center of the inner frame 59, or lateral position, of the box is accordingly variable within predetermined limits and its position at any given instant is dependent upon the elevation of the guns.

Fixedly carried by the outer cage upon a suitable plate 240 and underlying the orbit described by the control switch box as the inner cage revolves is a plate cam 241, provided with outwardly projecting lobes whose angular positionings correspond to the angular positioning of obstructions against which the guns might be struck. The extent of outward projection of the cam lobes bears the same relation to the height of the obstructions as the lateral or radial position of the box 235 bears to the elevation of the guns. Thus if the guns are elevated sufficiently to clear a given obstruction, the box is moved far enough outward so that the switch actuating follower 236 clears the corresponding cam lobe, while if the guns are depressed sufficiently to strike the obstruction, the box is moved correspondingly farther inward, and the follower 236 strikes the side or top of the lobe in question, depending upon the position of the box with respect to the center of the turret, and upon whether or not the turret is rotating. If the turret is rotating, the follower is moved laterally with respect to the box, in a direction dependent upon the direction of rotation of the turret.

The follower is mounted for movement both radially and tangentially in the box 235, being carried by a ball joint 234 and yieldably held in a centered position, in which all of the switches 230, 231, 233 are closed, by a centering spring 232. Upon striking the side of one of the cam lobes in the manner described, during rotation of the turret, the direction of movement of the follower with respect to the box is such that its upper end, which projects into the box in a position to actuate all of the micro-switches 230, 231, 233, opens that one of the switches 230, 231, corresponding to the direction of rotation of the turret. Rotation in that direction is therefore stopped, although the other two of the three switches (230, 231, 233) remain closed, so that the direction of rotation of the turret may be reversed, or the guns may be elevated, or both, although continued rotation in the same direction with the guns depressed to the same degree is blocked. When the turret is backed or the guns are raised sufficiently to move the follower 236 away from the lobe in question, that one of the switches 230, 231, which had been opened is closed under its spring action, and the follower returns to the centered position, so that resumption of rotation of the turret in the direction previously blocked becomes possible. If the guns are raised sufficiently to clear the obstruction, the follower will clear the lobe and rotation will not be stopped. The switches 230, 231 are arranged on either side of the upper end of the follower, while switch 233 is disposed analogously on the side toward the center of the turret, in position to be opened if the box is moved inwardly, by depression of the guns, at a point where one of the interference cam lobes, as 249, is arranged to limit depression of the guns, in which event switch 233 is automatically opened and depression stopped.

Inward and outward movement of the box is effected by a cam 245 (Fig. 42) having a spiral contour described about the axis of elevation of the guns as a center, and so calculated and related to the similarly proportioned cam 241 as to move the box with respect to the cam at a rate corresponding in predetermined ratio to the rate of elevation and depression of the guns. The cam is carried by and rockable with the rocking framework 87 which supports the guns, while the follower 244 is carried by the inner basket 59 independently of the rocking frame, but mounted in such manner that it is radially slidable toward and from the axis. The follower 244 is connected to the box 235 by a Bowden wire 243 in such manner as to move the box inwardly of the turret as the guns are depressed, and outwardly as the guns are raised, the follower being maintained in contact with the cam by the spring 248 as well as by springs 246, 247.

Limit switch 230 breaks the circuit of and stops motor 100 if the follower 236 is rocked in the direction in which it is moved by contact with the side of one of the cam lobes while the guns are turning in the direction corresponding to left traverse, while switch 231 similarly opens the field circuit and stops the motor 100 if the motor is turning in the direction for right traverse, the follower then being cocked in the opposite direction and acting upon this switch, as will be evident from Figures 37–41. Limit switch 233 is connected to the field control system for the elevating motor 150 in such manner as to break the field circuit and stop the motor whenever the box moves inward in such manner as to strike the end of follower 236 against the top of one of the cam lobes, which will be seen to rock the upper end of the follower inward and open the switch. This of course is effected by depression of the guns to a point where they might strike an obstruction.

Automatic fire interrupter

Also housed in the switch box 235 and arranged in series with the electric gunfiring circuit is a switch 251, which also may be of the micro-type. As shown in the schematic view, Figure 37, this switch is in series with the source of power and with the trigger switch 250 in the control handle. Also in series with this circuit are a switch 255 operated by the dead man's grip lever 222 on the back of the butt of the pistol-shaped handle, and gun-selector switches 252, 253, also carried in the control handle, and each of which is in series with one of the gunfiring solenoids 83, 84. These switches are operable by thumb pieces 256, 257, projecting conveniently from the sides of the pistol grip, while the trigger switch is operable by a conventionally arranged trigger 258.

The fire interrupter switch 251 is operable by a plunger 237 projecting from the bottom of the switch box 235 and adapted to engage a fire control cam 259, the general arrangement of which is concentric with the cam 241, but the contour of which is such as to provide an upwardly and outwardly projecting lobe for each position at which fire is to be interrupted. The circumferential length of each lobe corresponds to the angle through which fire is to be prevented, and the distance which it projects from the center of the turret is determined by the elevation necessary to enable the guns to fire over the protected part. Since the inward and outward movement of the switch box is controlled by the elevation of the guns, each lobe (as 259') of the fire control cam, is proportioned to the height of the protected part, so that firing is permitted so long, or as soon as, the elevation of the guns is sufficient to clear the protected part.

The main power switch 260 is shown as housed by a fixed portion of the turret and magnetically operable by opening and closing solenoids 261, 262. On and off control switches 263, 264 respectively, arranged in series with the power switch operating solenoids, are carried in a main control box 265 positioned conveniently to the hand of the gunner, and power control switches 266, 267 are also provided in a second control box 270 positioned on a fixed portion of the fuselage. The turret control box 265 may also be provided with accessory power outlets as 271, 272 for heater, pilot light, etc.

Figures 44 and 45 show a somewhat modified speed control assembly, in which the carbon pile 185A bears at its upper end against a fixed abutment 204A and is urged upwardly by means of a cam 215A attached to the end of the operating rod or plunger 200A. The cam will be seen to be inclined upwardly in both directions from its center, and to react against a follower roller 202A carried by the movable platform 204A upon which the bottom of the pile rests. This arrangement will be seen to be such that movement of the plunger 200A either inwardly or outwardly tends to compress the pile and so increase the current and the speed of the controlled motor. Within the same casing portion 186A which houses the actuating mechanism for the carbon pile, may also be housed the reversing relay assembly 220A and the reversing switch as 221A, the latter actuable by a cam 196A attached to and operable with the plunger 200A.

The operation of the mechanism would seem to be quite obvious from the foregoing description, but to sum it up from the standpoint of the gunner, consists of his first so regulating the seat adjustment as to bring the gun sight into proper location and in his use of the control member 188. The latter when in its centralized position, maintains the movable turret cage in the position in which it happens to be when the gunner enters, by moving this handle 188 to either side causes rotation of the cage about a vertical axis in the direction of movement of the handle. If rapid motion is desired, the handle is moved quickly and a relatively great distance from center. If, on the other hand, he desires a slow movement, slight movement of the handle laterally will produce slow movement of the cage.

Movement of the handle member 188 vertically up or down produces corresponding elevation or depression of the guns without lateral movement, and the speed of movement is controlled in the same fashion as first described. Of course combined movement of the handle will produce a corresponding combined movement of the guns; that is, a diagonal movement.

In order to prevent physical interference between the guns and adjacent fuselage or other supporting portions against which the guns might be struck, limit switches 230 and 231 are incorporated in the field circuit control system for the traversing motor, and a limit switch 233 is incorporated in the field circuit control system for the elevating motor 150, as stated heretofore.

The cam plate 241 is provided with projecting lobes and upon striking the side of one of the cam lobes during rotation of the turret, the direction of movement of the follower with respect to the box is such that its upper end, which projects into the box in a position to actuate all of the micro-switches 230, 231 and 233, opens that one of the switches 230, 231, corresponding to the direction of rotation of the turret. Rotation in that direction is therefore stopped, although the other two of the three switches remain closed, so that the direction of rotation of the turret may be reversed or elevated, or both, although continued rotation in the same direction with the guns depressed to the same degree is blocked. When the turret is backed or the guns are raised sufficiently to move the follower 236 away from the lobe in question, that one of the switches 230, 231, which has been opened is closed under its spring action so that resumption of rotation of the turret in the direction previously blocked becomes possible. If the guns are raised sufficiently to clear the lobe, rotation will not be stopped. The switches 230, 231 are arranged on either side of the upper end of the follower, while switch 233 is disposed on the side toward the center of the turret in position to be opened as the box is moved inwardly by depression of the guns at a point where one of the interference cam lobes, such as 249, is arranged to limit depression of the guns, in which event switch 233 is automatically opened and continued depression of the guns is stopped.

We are aware that the invention may be embodied in other specific forms without departing from the spirit or essential attributes thereof, and we therefore desire the present embodiment to be considered in all respects as illustrative, and not restrictive; reference being had to the appended claims rather than to the foregoing description to indicate the scope of the invention.

We claim:

1. In a gun mounting construction incorporating a gun support, power driving means for moving said support in traverse and elevation, personally operable control means for said driving means, and automatic supervisory control means for preventing movement of said support to an unwanted position by said personally operable control means, including an automatic traverse stop motion control element, an automatic elevation stop motion control element, a carriage carrying both of said elements and rotatable with the gun support in traverse, in a virtual orbit, but not movable therewith in elevation, means for moving said carriage in a direction transverse with respect to its orbit in response, and in proportion, to movements of the gun support in elevation, actuating means for both of said elements, cam means fixed against rotation and having a portion corresponding in its angular positioning to the location of a zone to which it is desired to prevent training the gun when the latter is at a certain elevation, said cam means having an effective portion extending in said transverse direction a distance proportioned both to the elevation of the gun support and to the vertical height of the zone into which direction of the gun is desired to be prevented, and means actuable by said cam means for actuating both of said elements.

2. In a gun mounting construction, a fixed support, a cage rotatable with respect thereto about a generally vertical axis to train a gun carried in the mounting, a gun support adapted to carry a gun and rotatable in the cage about a generally horizontal axis to elevate and depress the gun, power driving means for rotating said cage and said support, personally operable control means for said driving means, and automatic supervisory control means for preventing movement of said support to an unwanted position, comprising a traverse interrupter element connected to the driving means for the cage and actuable to stop drive of the latter, an elevation interrupter element connected to the driving means for said gun support and actuable to stop drive of the latter, a movable support carried by and rotatable with the cage and carrying both of said elements, said movable support describing a virtual orbit as the cage is rotated, means for moving said movable support in a transverse direction with respect to said orbit in response, and in proportion, to rotative movement of the gun support about said horizontal axis, cam means carried by the fixed support and corresponding in azimuth to the azimuth of a zone into which it is desired to prevent training the gun, said cam means having an effective portion extending in said transverse direction to a position corresponding to the elevation of the gun at one of the boundaries of the zone into which movement of the gun is desired to be prevented, said traverse interrupter element being actuable by said cam means during rotation of said cage, and said elevation interrupter element being actuable by said cam means during transverse movement of said movable support.

3. Means as set forth in claim 2 including a common actuating member for both of said interrupter elements, said member being movable in one direction by engagement with said cam means, to actuate the traverse interrupter element, and in another direction by engagement with said cam means in a different direction to actuate the elevation interrupter element.

4. In a gun mounting construction, a fixed support, a cage rotatable with respect thereto about a generally vertical axis to train a gun carried in the mounting, a gun support adapted to carry a gun and rotatable in the cage about a generally horizontal axis to elevate and depress the gun, power driving means for rotating said cage and said support, personally operable control means for said driving means, and automatic supervisory control means for preventing movement of said support to an unwanted position, comprising a traverse interrupter element operatively connected to the driving means for the cage and actuatable to stop drive of the latter, an elevation interrupter element operatively connected to the driving means for said gun support and actuable to stop drive of the latter, a movable support carried by and rotatable with the cage and carrying both of said elements, said movable support describing a virtual orbit as the cage is rotated, means for moving said movable support in a direction transverse with respect to said orbit in response, and in proportion, to rotation of said gun support with respect to the cage, substantially circular cam means carried by said fixed support and lying adjacent said orbit, said cam means having an effective portion extending in said transverse direction and proportioned correspondingly to the relationship between the transverse movements of said movable support and the elevational movements of the gun support, means carried by the movable support and engageable with said cam means to actuate said traverse interrupter element, and said elevation interrupter element, said means being movable in one direction by engagement with a side portion of said cam means to actuate the traverse interrupter element and being movable in another direction when moved into engagement with the cam by transverse movement of said movable support, to actuate the elevation interrupter element.

5. In a gun mount, in combination with a fixed support, a cage rotatable with respect thereto about a generally vertical axis to train a gun carried by the mount, a gun support carried by the standard and rockable therein about a generally horizontal axis to elevate and depress the gun, and automatic means for preventing movement of said gun support to a predetermined position, comprising an elevation stop element, a traverse stop element, a movable support carrying both of said elements and carried by and rotatable with the standard and describing a virtual orbit when said standard is rotated, means for moving said movable support in a path transverse with respect to said orbit in response, and at a rate proportional to rocking movements of the gun support about said horizontal axis, cam means carried by said fixed support and lying adjacent said orbit, said cam means having a portion corresponding in circumferential length to the circumferential angular length of a protected zone into which it is desired to prevent pointing the gun, and extending in said transverse direction an effective distance bearing the same proportion to the vertical angular dimension of the protected zone as the transverse movements of said movable support bear to the elevational movements of the gun, said traverse stop element becoming effective by operative connection with said cam means during rotative movement of said movable support about the vertical axis of said standard, and the elevation stop element becoming effective by operative connection with said cam means during transverse movement of said movable support.

6. In a gun mount, in combination with a fixed support, a frame rotatable therein about a generally vertical axis, a gun-support journaled in the frame for elevational rotation about a generally horizontal axis and also rotatable with the frame in traverse about said vertical axis, means for rotating the gun support in each direction about said horizontal axis, means for reversing the direction of rotation of each of said rotatable means, stop means for interrupting rotation of said frame in either direction in which it is being driven without interfering with operation of said reversing means, said stop means including an electric switch and operating means therefor having one part carried by said frame and another part carried by said fixed support, said parts being operatively engageable to operate said switch in response to angular movement of the frame about said vertical axis, and means responsive to rotation of said gun support about said horizontal axis for changing the operative relation between said parts, whereby the traverse rotation about said vertical axis is automatically controllable in response to both the azimuth and elevation of a gun carried by said gun support, and means responsive to rotation of said gun support beyond predetermined positions about both axes for actuating said stop means.

7. In a gun mount, in combination with a fixed support, a frame rotatable therein about a generally vertical axis, a gun-support journaled in the frame for elevational rotation about a generally horizontal axis and also rotatable with the frame in traverse about said vertical axis, means for rotating the gun support in each direction about said horizontal axis, means for reversing the direction of rotation of each of said rotatable means, stop means for interrupting rotation of said frame in either direction in which it is being driven without interfering with operation of said reversing means, said stop means including an electric switch, and operating means for said switch including one part carried by said frame and another part carried by said fixed support, said switch being carried by one of said parts, one of said parts being movable in an operative orbit during traverse, in which orbit it is engageable and disengageable with the other part to operate said switch, and means responsive to rotation of said gun support about said horizontal axis for moving said parts into and out of said operative orbit, and means responsive to rotation of said gun support beyond predetermined positions about both axes for actuating said stop means.

8. In a gun mount, in combination with a fixed support, a frame rotatable therein about a generally vertical axis, a gun-support journaled in the frame for elevational rotation about a generally horizontal axis and also rotatable with the frame in traverse about said vertical axis, means for rotating the gun support in each direction about said horizontal axis, means for reversing the direction of rotation of each of said rotatable means, stop means for interrupting rotation of said frame in either direction in which it is being driven without interfering with operation of said reversing means, said stop means including a plurality of electric switches, including at least one for interrupting rotation of the frame in each direction about said vertical axis, and operating means for said switches including one part carried by said frame and another part carried by said fixed support, said switches being carried by that one of said parts which is carried by the frame, said part being movable during traverse in an operative orbit in which it is engageable and disengageable with respect to the other part to operate said switch, and means responsive to rotation of said gun support about said horizontal axis for moving said part into and out of said operative orbit, and means responsive to rotation of said gun support beyond predetermined positions about both axes for actuating said stop means.

9. In a gun mount, in combination with a fixed support, a frame rotatable therein about a generally vertical axis, a gun-support journaled in the frame for elevational rotation about a generally horizontal axis and also rotatable with the frame in traverse about said vertical axis, means for rotating the gun support in each direction about said horizontal axis, means for reversing the direction of rotation of each of said rotatable means, stop means for interrupting rotation of said frame in either direction in which it is being driven without interfering with operation of said reversing means, said stop means including a plurality of electric switches, including at least one for interrupting rotation of the frame in each direction about said vertical axis, and one for interrupting depression of said gun support about said horizontal axis, and operating means for said switches including one part carried by said frame and another part carried by said fixed support, said switches being carried by that one of said parts which is carried by the frame, said part being movable during traverse in an operative orbit in which it is engageable and disengageable with respect to the other part to operate said switches for interrupting rotation about said vertical axis, means responsive to rotation of said gun support about said horizontal axis for moving said part into and out of said operative orbit, said stop switch for interrupting rotation of said gun support about said horizontal axis being actuable by movement of said part into and out of operative orbit when said movable part is in alignment with the other part, and means responsive to rotation of said gun support beyond predetermined positions about both axes for actuating said stop means.

10. In a gun mount, in combination with a fixed support, a frame rotatable therein about a generally vertical axis, a gun-support journaled in the frame for elevational rotation about a generally horizontal axis and also rotatable with the frame in traverse about said vertical axis, means for rotating the gun support in each direction about said horizontal axis, means for reversing the direction of rotation of each of said rotatable means, stop means for interrupting rotation of said frame in either direction in which it is being driven without interfering with operation of said reversing means, said stop means including an electric switch and operating means therefor having one part carried by said frame and another part carried by said fixed support, and means responsive to rotation of said gun support beyond predetermined positions about both axes for actuating said stop means.

11. In a gun mount, in combination with a fixed support, a frame rotatable therein about a generally vertical axis, a gun-support journaled in the frame for elevational rotation about a generally horizontal axis and also rotatable with the frame in traverse about said vertical axis, means for rotating the gun support in each direction about said horizontal axis, means for reversing the direction of rotation of each of said rotatable means, stop means for interrupting rotation of said frame in either direction in which it is being driven without interfering with operation of said reversing means, said stop means including an electric switch and operating means therefor having one part carried by said frame and another part carried by said fixed support, and means responsive to rotation of said gun support about said horizontal axis for changing the operative relation between said parts, whereby the traverse rotation about said vertical axis is automatically controllable in response to both the azimuth and elevation of a gun carried by said gun support, and means responsive to rotation of said gun support beyond predetermined positions about both axes for actuating said stop means.

12. In a gun mount, in combination with a fixed support, a frame rotatable therein about a generally vertical axis, a gun-support journaled in the frame for elevational rotation about a generally horizontal axis and also rotatable with the frame in traverse about said vertical axis, means for rotating the gun support in each direction about said horizontal axis, means for reversing the direction of rotation of each of said rotatable means, stop means for interrupting rotation of said frame in either direction in which it is being driven without interfering with operation of said reversing means, said stop means including an electric switch, and operating means for said switch including one part carried by said frame and another part carried by said fixed support, said switch being carried by one of said parts, one of said parts being movable in an operative orbit during traverse, in which orbit it is engageable and disengageable with the other part to operate said switch, and means responsive to rotation of said gun support beyond predetermined positions about both axes for actuating said stop means.

13. In a gun mount, in combination with a fixed support, a frame rotatable therein about a generally vertical axis, a gun-support journaled in the frame for elevational rotation about a generally horizontal axis and also rotatable with the frame in traverse about said vertical axis, means for rotating the gun support in each direction about said horizontal axis, means for reversing the direction of rotation of each of said rotatable means, stop means for interrupting rotation of said frame in either direction in which it is being driven without interfering with operation of said reversing means, said stop means including a plurality of electric switches, including at least one for interrupting rotation of the frame in each direction about said vertical axis, and operating means for said switches including one part carried by said frame and another part carried by said fixed support, said switches being carried by that one of said parts which is carried by the frame, said part being movable during traverse in an operative orbit in which it is engageable and disengageable with respect to the other part to operate said switch, and means responsive to rotation of said gun support about said horizontal axis for moving said part into and out of said operative orbit, and means responsive to rotation of said gun support beyond predetermined positions about at least one of said axes for actuating said stop means.

14. In a gun mount, in combination with a fixed support, a frame rotatable therein about a generally vertical axis, a gun-support journaled in the frame for elevational rotation about a generally horizontal axis and also rotatable with the frame in traverse about said vertical axis, means for rotating the gun support in each direction about said horizontal axis, means for reversing the direction of rotation of each of said rotatable means, stop means for interrupting rotation of said frame in either direction in which it is being driven without interfering with operation of said reversing means, said stop means including a plurality of electric switches, including at least one for interrupting rotation of the frame in each direction about said vertical axis, and one for interrupting depression of said gun support about said horizontal axis, and operating means for said switches including one part carried by said frame and another part carried by said fixed support, said switches being carried by that one of said parts which is carried by the frame, said part being movable during traverse in an operative orbit in which it is engageable and disengageable with respect to the other part to operate said switches for interrupting rotation about said vertical axis, means responsive to rotation of said gun support about said horizontal axis for moving said part into and out of said operative orbit, and means responsive to rotation of said gun support beyond predetermined positions about at least one of said axes for actuating said stop means.

15. In a gun mounting construction incorporating a gun support, power driving means for moving said support in traverse and elevation, personally operable control means for said driving means, and automatic supervisory control means for preventing movement of said support to an unwanted position by said personally operable control means, including an automatic traverse stop motion control element, an automatic elevation stop motion control element, a carriage carrying both of said elements and rotatable with the gun support in traverse, in a virtual orbit, but not movable therewith in elevation, means for moving said carriage in a direction transverse with respect to its orbit in response, and in proportion, to movements of the gun support in elevation, actuating means for both of said elements, means fixed against rotation and having a portion corresponding in its angular positioning to the location of a zone to which it is desired to prevent training the gun when the latter is at a certain elevation, said means having an effective portion extending in said transverse direction a distance proportioned both to the elevation of the gun support and to the vertical height of the zone into which direction of the gun is desired to be prevented, and means actuable by said means for actuating both of said elements.

16. In a gun mounting construction, a fixed support, a cage rotatable with respect thereto about a generally vertical axis to train a gun carried in the mounting, a gun support adapted to carry a gun and rotatable in the cage about a generally horizontal axis to elevate and depress the gun, power driving means for rotating said cage and said support, personally operable control means for said driving means, and automatic supervisory control means for preventing movement of said support to an unwanted position, comprising a traverse interrupter element connected to the driving means for the cage and actuable to stop drive of the latter, an elevation interrupter element connected to the driving means for said gun support and actuable to stop drive of the latter, a movable support carried by and rotatable with the cage and carrying both of said elements, said movable support describing a virtual orbit as the cage is rotated, means for moving said movable support in a transverse direction with respect to said orbit in response, and in proportion, to rotative movement of the gun support about said horizontal axis, a member element carried by the fixed support and corresponding in azimuth to the azimuth of a zone into which it is desired to prevent training the gun, said member element having an effective portion extending in said transverse direction to a position corresponding to the elevation of the gun at one of the boundaries of the zone into which movement of the gun is desired to be prevented, said traverse interrupter element being actuable by said member element during rotation of said cage, and said elevation interrupter element being actuable by said member element during transverse movement of said movable support.

17. In a gun mount, in combination with a fixed support, a cage rotatable with respect thereto about a generally vertical axis to train a gun carried in said mount, a gun-support journaled in the cage for elevational rotation about a generally horizontal axis and also rotatable with the cage in traverse about said vertical axis, means including a motor for rotating the gun support in each direction about said horizontal axis, means for reversing the direction of rotation of each of said rotatable means, said reversing means including a crown gear, a pinion in meshed relation with said crown gear and driving means for said pinion, means including a pivoted control handle for controlling the operation of said driving means, and means connected to said driving means for rotating the gun support in each direction about a horizontal axis, and actuated by said control handle, said last mentioned means including mechanism for moving the cage from side to side about a vertical axis in the direction of movement of the said handle, and for moving the gun support vertically up and down about said horizontal axis to an elevated or depressed position when said handle is operated, and said last-mentioned means also serving to provide a combined movement of the gun support due to rotational movement of the cage and vertical movement of the gun support when the handle is operated in a composite direction.

PRESTON T. TUCKER.
WILLIS G. STEWART.
JAMES H. TANNER.